United States Patent [19]

Opstad et al.

[11] Patent Number: 5,416,898
[45] Date of Patent: May 16, 1995

[54] APPARATUS AND METHOD FOR GENERATING TEXTUAL LINES LAYOUTS

[75] Inventors: David G. Opstad; Eric R. Mader, both of Mountain View, Calif.

[73] Assignee: Apple Computer, Inc., Cupertino, Calif.

[21] Appl. No.: 881,789

[22] Filed: May 12, 1992

[51] Int. Cl.⁶ ............................................. G06F 3/14
[52] U.S. Cl. ................................................. 395/150
[58] Field of Search ............... 395/161, 150, 151, 110; 345/143

[56] References Cited

U.S. PATENT DOCUMENTS

| | | | |
|---|---|---|---|
| 4,745,561 | 5/1988 | Hirosawa et al. | 395/150 |
| 4,827,254 | 5/1989 | Nishiyama | 345/143 X |
| 5,175,811 | 12/1992 | Sone et al. | 395/150 X |
| 5,185,818 | 2/1993 | Warnock | 395/150 X |
| 5,201,032 | 4/1993 | Kurose | 395/150 |
| 5,251,293 | 10/1993 | Ishii et al. | 395/150 X |
| 5,257,351 | 10/1993 | Leonard et al. | 345/143 X |
| 5,289,169 | 2/1994 | Corfield et al. | 345/143 X |
| 5,289,170 | 2/1994 | Fujii | 345/143 X |

*Primary Examiner*—Heather R. Herndon
*Assistant Examiner*—Cliff N. Vo
*Attorney, Agent, or Firm*—Blakely, Sokoloff, Taylor & Zafman

[57] ABSTRACT

A computer system for rendering text is provided. A keyboard is used to enter characters into the computer system. A character code corresponding to each entered character is generated. A particular font is chosen from a font table stored in memory. The font table contains a number of different fonts, with each font having a number of glyph indexes corresponding to a number of different glyphs. A character can have a plurality of different glyph indexes for a particular font. A processor maps the character code to a glyph index according to the selected font and later processes the glyph index. The glyph corresponding to the processed glyph index is then displayed.

29 Claims, 14 Drawing Sheets and so on...

To To

X - Y vs. X - Y

Figure 8
Hotel... Hotel...
Other... Other...
Hotel... Hotel...
Figure 9
"The quick brown fox jumped over the lazy dog," said the sage.
Figure 10
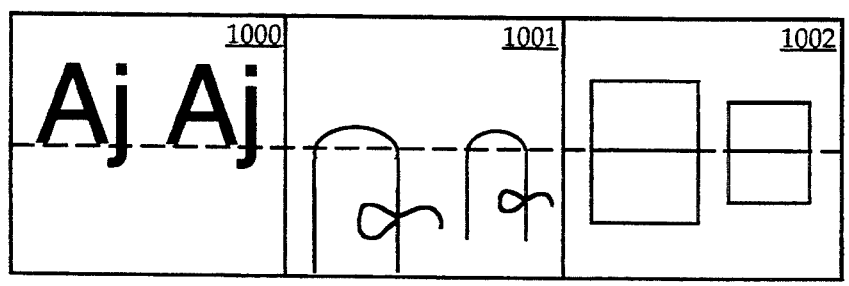
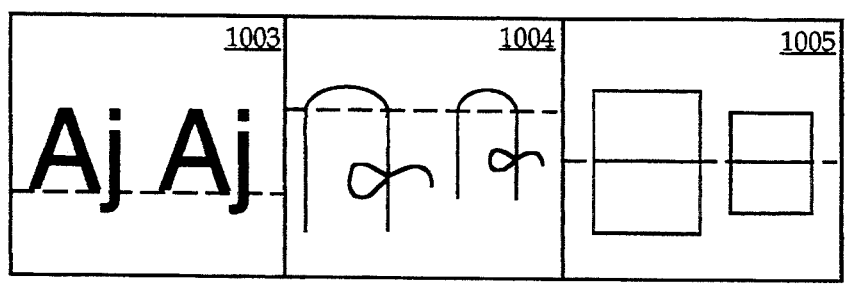

APPARATUS AND METHOD FOR GENERATING TEXTUAL LINES LAYOUTS

FIELD OF THE INVENTION

The present invention pertains to the field of computer systems. More particularly, the present invention relates to an apparatus and method for rendering textual line layouts.

BACKGROUND OF THE INVENTION

Computers are designed to process, store, and retrieve data according to a computer program. Because computers are becoming faster, more powerful, while at the same time, more affordable, they are increasingly finding uses in various fields. Not surprisingly, one field in which computers have successfully been employed is that of word processing and desktop publishing applications.

In the preparation of textual documents, computer applications for word processing and desktop publishing offer the user great versatility in its appearance and in any subsequent editations. Features such as the size, font, layout, format, alignment, outline, and graphics of a document is readily under the control of the user. In addition, the user has control over the page numbering, footnoting, indenting, underlying, embolding, shadowing, and italicizing of certain text within the document. Moreover, standard word processing and desktop publishing applications provide the user with handy edit commands such as finding, inserting, deleting, cutting, pasting, and spell checking. Changes to the document can be made globally or only to selected portions. The completed textual document can be electronically stored (e.g. floppy disk drive, hard disk drive, optical disk drive) and retrieved or updated at a later time. Indeed, access to the textual document can be shared by multiple users on multiple computer terminals by utilizing a file server on a computer network. More commonly, a hard copy of the finished textual document is made by printing it out on paper.

Traditionally, the user interlaces with the computer system by means of a QWERTY keyboard. Textual data is entered into the computer system by typing characters (e.g., letters, numbers, and symbols) on the keyboard. The entered characters are temporarily saved in the computer's memory and are displayed on a cathode ray tube (CRT) display device. Thereupon, the user may elect to enter more text, edit the existing text, write the document onto a storage medium, or print the document.

In typical prior art computer systems, the user enters a character into the computer system by depressing or "typing" a key on the keyboard corresponding to that character. By depressing that key, the user causes an electrically encoded signal representing that key's character to be generated and sent to the computer. Some of the more widely used character encoding schemes include ASCII and EBCDIC. Each character has its own unique code. Based on the codes received from the keyboard, the computer generates the glyph corresponding to that code. The glyph is displayed on the CRT display screen or printed on paper. For example, by depressing the "A" key on the keyboard, a hexadecimal code of "61" is generated and sent to the computer. The computer then generates a glyph "a" corresponding to that code. Thus, typical prior art word processing and desktop publishing applications essentially have a one-to-one correspondence between each character and a glyph representing that character.

One disadvantage with the prior art is that this one-to-one correspondence results in a rather inflexible system. Under such a system, the number of different glyphs is limited to the number of characters available. For example, given an 8-bit encoding scheme, there can only be $2^8=256$ different characters. Consequently, a font (i.e., a collection of glyphs usually having some element of design consistency in their appearances) is limited to only having 256 different glyphs. Some of the more stylistic, artistic, and visually appealing fonts require a greater variety of glyphs.

Furthermore, a related disadvantage with the typical prior art method for rendering text is that, in order to add a new glyph, a character code must be assigned to each of the new glyphs, to provide the user access to those glyphs. Hence, valuable character code space is consumed if additional glyphs are desired.

Another problem associated with typical prior art approaches for rendering text is that the character set might be too small to fully render a written language. Given a 256 character set, there are enough characters to adequately represent the capital and lower case 23 letters (a–z) of the Roman alphabet, Arabic numerals 0–9, punctuations, and other various symbols comprising most modern western and European languages. However, other types of script, such as Arabic and Hindi, can have upwards of 500 different contextual forms for a fancy font. Past approaches have been to select the 256 most important forms for presentation. Consequently, prior art text rendering methods have encountered problems when dealing with multilingual applications.

Yet another problem associated with prior art text rendering methods is that, in most instances, the person who designed the computer system also specified the character set. A subsequent font designer, who wishes to design a font for that computer system, is constrained to the pre-determined character set. Otherwise, there would not be a mechanism for accessing that particular glyph. As a result, the font designer is limited to designs which were anticipated by the computer designer.

Thus, what is needed is a textual rendering scheme whereby there can be a great number of different glyphs for a given character set. Thereby, the computer's range of things which can be rendered is greatly expanded.

SUMMARY AND OBJECTS OF THE INVENTION

In view of the problems associated with typical prior art text rendering mechanisms, one object of the present invention is to provide exacting control over the appearance of lines of text.

Another object of the present invention is to render multilingual lines of text, including text displayed in non-Roman scripts such as Arabic, Hindi, or Japanese.

Another object of the present invention is to provide a flexible line rendering method which is not limited to a one-to-one correspondence between each character and a glyph representing that character.

Another object of the present invention is to distinguish between glyphs and character codes, so that forms may be rendered without having those forms take up character code space.

Another object of the present invention is to implement a finite state machine to process input characters so that the output glyphs are context sensitive.

These and other objects of the present invention are provided by a means and method of controlling appearances of lines of text by controlling the appearance of glyphs representing text, their displayed sequence in a line, and their position with respect to the line and to each other. The present invention utilizes a number of different routine to first create the layouts of the lines and then to query, manipulate and text the created layouts. Once a layout has been built by one of the creation routines, manipulating routines are implemented to provide text-editing functions.

These routines fetch information contained in tables having data supplied by a font designer. Lookup tables are implemented as a method of taking a given glyph index and looking up some associated information. In addition, state tables provide for finite state machine processing. Thereby, input characters can be processed such that the glyph which is ultimately displayed, can depend upon the context in which it is used. Other tables include baseline, ligature, caret, optical bounds, glyph properties, glyph metamorphosis, track kerning, justification, feature name, and kerning tables.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 illustrates an example of optically misalignment at the extreme edges of a line.

FIG. 9 illustrates a "hanging" left quotation mark and a period.

FIG. 10 illustrates three scripts, wherein the baselines within each of the scripts match, but the relationship between the scripts are incorrect.

DETAILED DESCRIPTION

Figure 1:
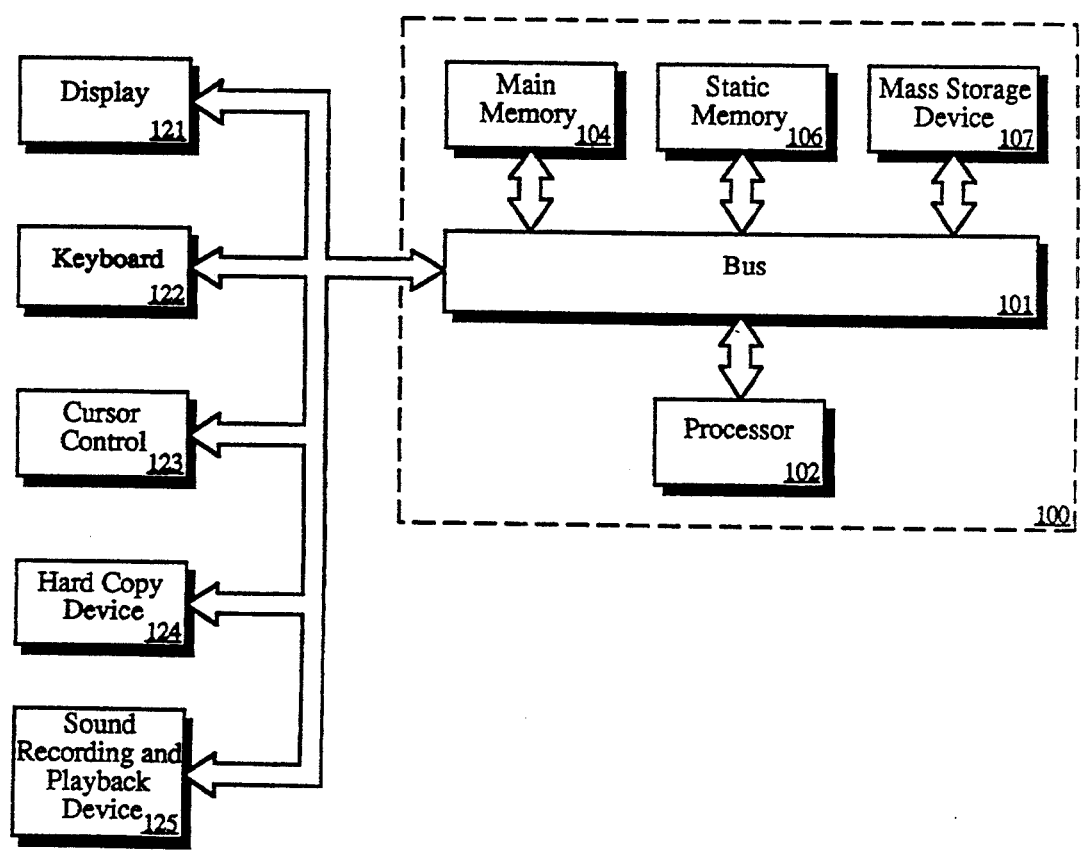
FIG. 1 illustrates the computer system upon which the preferred embodiment of the present invention is implemented.

An apparatus and method for enabling a user to control the appearance of textual characters, their displayed sequence in a line of text, and their position with respect to the line of text and to each other is described. In the following description, for purposes of explanation, specific data structures, routines, parameters, and formats are set forth in order to provide a thorough understanding of the present invention. It will be obvious, however, to one skilled in the art that these specific details need not be used to practice the present invention. In other instances, well-known structures and circuits, have not been shown in detail in order to avoid unnecessarily obscuring the present invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Definitions of Terminology Used in the Art

Some of the more commonly used terminology in the textual rendering art are described below. The present invention relates to layouts which describe the appearance of lines of text. Each layout describes a single line of text. A single line of text is comprised of one or more runs of text. Text within a run, share the same style. Text is defined as words of something written or printed. The text is displayed in the form of scripts. A script is defined as a style of writing with characters, usually resembling handwriting. Examples of different types of scripts include Roman, Arabic, Hindi, Chinese, Greek, Hebrew, etc.

Fundamental to understanding a layout is the distinction between characters and glyphs. A character is an abstract object having a single and unique semantic or phonetic meaning (e.g., A–Z, 0–9, !@#$%, etc.). A glyph represents the visual, graphical appearance of a character. For example, any of the following five glyphs: A, *A*, A, 𝐀, and 𝔄 can be used to represent the character of an upper case letter "A".

A font is a collection of glyphs which typically have an element of design consistency in their appearances. Aspects such as serifs, stroke thickness, ligatures, and contextual forms have a degree of commonality for a given font. Some sample fonts include Helvetica, Palatino, Times, Geneva, Courier, Chicago, Monaco etc. A serif is a fine line in printing used for finishing off the main strokes of a character. A ligature is a rendering form that represents a combination of two or more individual characters. An example of a ligature in the English language is that of an "fi" ligature which is formed by the combination of two separate letters "f" and "i". A contextual form is an alternate appearance of a glyph, whose use is dependent on certain contexts. In Arabic, for example, a single character can have multiple contextual forms corresponding to that character. The choice of which one of the different contextual forms is displayed, depends upon whether the character is at the beginning, middle, or end of a word.

The Computer System

Referring to FIG. 1, the computer system upon which the preferred embodiment of the present invention is implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, or cursor direction keys, coupled to bus 101 for communicating direction information and command selections to processor 102, and for controlling cursor movement on display 121. This input device typically has two degrees of freedom in two axes, a first axis (e.g. x) and a second axis (e.g. y), which allows the device to specify any position in a plane. Another device which may be coupled to bus 101 is hard copy device 124 which may be used for printing instructions, data, or other information on a medium such as paper, film, or similar types of media. Lastly, computer system 100 may be coupled to a device for sound recording and/or playback 125 such an audio digitizer means coupled to a microphone for recording information. Further, the device may include a speaker which is coupled to a digital to analog (D/A) converter for playing back the digitized sounds.

In the currently preferred embodiment, computer system 100 is one of the Macintosh ® family of personal computers such as the Macintosh ® II manufactured by Apple ® Computer, Inc. of Cupertino, Calif. (Apple and Macintosh are registered trademarks of Apple Computer, Inc.). Processor 102 is one of the 68000 families of microprocessors, such as the 68000, 68020, or 68030 manufactured by Motorola, Inc. of Schaumburg, Ill.

Line Layout Features

The present invention allows a user to control the appearance of individual glyphs, the order of glyphs on the line, and the spatial location of glyphs on the line. The first two facilities are non-positional. In other words, they deal with transformations of the appearance and order of glyphs on the line, rather than with positioning the glyphs. The third facility is positional. It deals with the position of a glyph in relation to the base line and to adjacent glyphs. These facilities are controlled by tables in the font.

Figure 2:
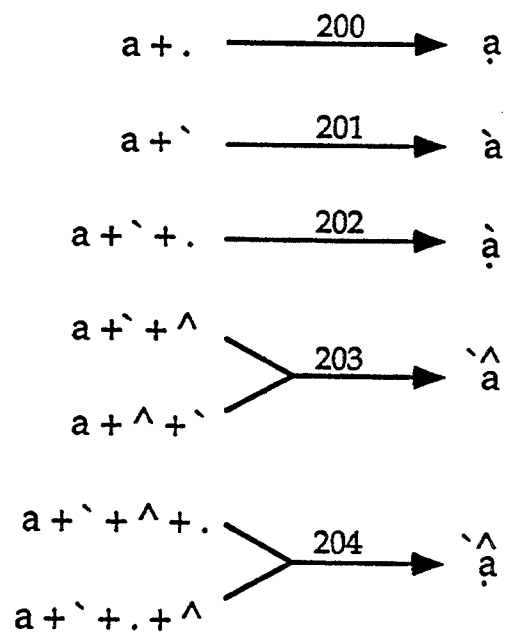
FIG. 2 illustrates examples wherein the letter "a" is combined with various marks, resulting in various ligatures.
Figure 3:
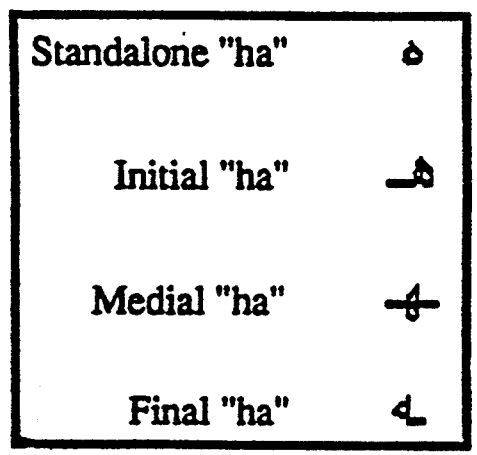
FIG. 3 illustrates various contextual forms of the Arabic letter "ha".

The currently preferred embodiment performs form substitution, wherein one or more glyphs is substituted for one or more other glyphs, according to a pre-determined process. Form substitution encompasses both ligature and contextual form generation. FIG. 2 illustrates examples wherein the letter "a" is combined with various accent marks, resulting in various ligatures. For example, the glyph "a" combined with the mark. " " can be substituted with the glyph "â" 200. The combination of a letter with an accent, resulting in an accented letter is shown in 201. An example of an accented letter plus an applied mark is shown in 202. A letter with applied accent ligature is shown in 203. A letter with an applied accent ligature and an applied mark is shown in 204. FIG. 3 illustrates various contextual forms of the Arabic letter "ha". The form of that letter varies, depending on whether it is standing alone or at the start, middle, or end of a word. Note that the same character code is used for each case. The present invention determines which of these glyphs is appropriate, based on the current conditions and then displays the correct glyph. It is the font designer's decision as to choosing between using ligatures and contextual forms.

In the present invention, ligatures can be split for interaction. Given a layout which implements ligatures and a flashing caret positioned to the left of an "fi" ligature, there are two approaches for handling the situation when a user presses the right-arrow key. The indivisible approach treats the ligature as an indivisible whole for purposes of caret location. The divisible approach allows the caret to appear inside the ligature. In both cases, editing occurs one character at a time, rather than one glyph at a time. For instance, if the caret were positioned to the right of the ligature, a single backspace does not delete the whole ligature. Instead it deletes only the "i", leaving an "f" character.

The present invention also handles fractions by means of swashes and contextual forms. A swash is a variation, often ornamental, of an existing glyph. Some of the choices for swash variants is made by the font designer at the time the font is created. Collections of swash forms are grouped by the designer and listed in a named swash table. The named swash table is accessed by an application in a layout call and the specified swash forms are used. Thereby, given a fraction character code, a font designer can set up a font table that recognizes strings of the type "digits, fraction, digits". If there is no pre-drawn fractional form, smaller superscript and subscript swash digit glyphs can be substituted. Alternatively, a cross-stream kerning table can be set up to shift digits relative to the baseline.

Figures 4, 5, 6, 7:
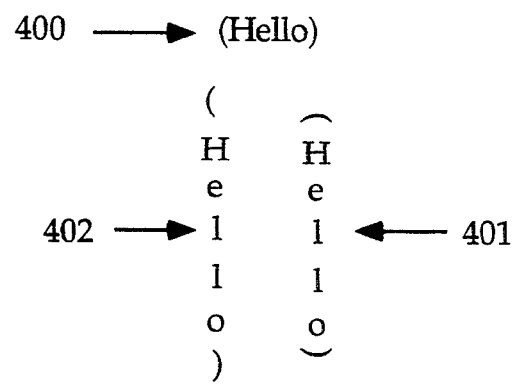
FIG. 4 illustrates a standard horizontal text and two vertical equivalents; one without vertical substitution swash forms in the font and one with the appropriate vertical substitution swash forms in the font.
FIG. 5 illustrates the effect of kerning.
FIG. 6 illustrates a hyphen between two capital letters which should be raised to reflect the centers of those characters.
FIG. 7 illustrates an alignment problem, wherein different sizes of the same font are flush left.

The present invention also allows for vertical substitution of forms. Vertical substitution is a type of swash variation in which a given glyph code is replaced by an alternate form in a vertical line. Note that this procedure is not equivalent to rotating the glyph. In the present invention, the vertically rotated forms exist in the font and are so indicated in the font tables. There are no character substitutions. FIG. 4 illustrates a standard horizontal text 400 and two vertical equivalents; one without vertical substitution swash forms in the font 401 and one with the appropriate vertical substitution swash forms in the font 402.

In addition, swash variants can also be used in generating small caps. Rather than just shrinking capital letters into slightly smaller sizes, the present invention allows specification of small caps as a special form of swash variants.

The present invention also includes features to support rendering text in different directions: horizontal or vertical, left-to-right, or right-to-left. The user presents the characters in phonetic order, not in visual order. The present invention performs linguistic reordering and rearrangement. Languages rendered right-to-left (e.g. Hebrew and Arabic) can be intermixed with languages rendered left-to right. The reordering level number for each run of text is specified. The reordering level number controls how the line is reordered. In some languages (e.g. Indic derivations, vowel markers in many Southeast Asian languages), certain rearrangements of visual glyph order might occur even though the script is considered left-to-right. Irrespective of this phenomenon, text is input in typing order and the present invention arranges the correct visual order.

The present invention also controls glyph positioning. As contrasted with non-positional functions controlling glyph identities and transformations, the positional functions change the positions of glyphs in a line. These positional changes include the changes made during the justification, kerning, tracking, superscripting, and subscripting processes. The positional changes can occur via tables in fonts or can be specified by an application.

One aspect of glyph positioning is that of positional shifts: with-stream and cross-stream shifting. Cross-stream shifts raise or lower the entire style run and the corresponding horizontal movement for vertical text. It can also be used for superscript and subscript effects. This is accomplished by shifting (up or down) each glyph in the style by a given offset. With-stream shifts tighten or loosen the spacing between each glyph in the run, and can also be used for manual kerning or letter-spacing. With-stream alignment is accomplished by shifting each glyph in the style run by a given offset closer to or further from the previous glyph. The following example illustrates a with-stream shift: ab c de. The third and fourth glyphs (i.e., "c" and "d") have with-stream shift values added to their left sides. When text s shifted upstream or downstream, the boundary between the glyphs is adjusted to be halfway in between the advance of the earlier glyph and the origin of the later glyph.

Another aspect of glyph positioning is that of kerning. Kerning is defined as the fine adjustment to the normal spacing that occurs between two or more glyphs. This is usually done to improve the apparent letter spacing between characters that naturally "fit together". Font tables specify the distance by which the spacing between two glyphs is to be increased or decreased. The distance might depend on other than just the two adjacent glyphs; it can also depend on preceding or following glyphs. The font tables map n glyphs into n-1 kerning values (i.e., inter-glyph positional shifts). When kerning, the offset is effectively split between the characters. FIG. 5 illustrates the effect of kerning. The example to the right illustrates the position of a caret between two characters with kerning.

Cross-stream kerning allows the movement of characters perpendicular to the line orientation of the text. For example, a hyphen between two capital letters should be raised to reflect the centers of those characters, as illustrated in FIG. 6. Cross-stream kerning is required for some script forms (e.g., Taliq). It can also be used to assist in the creation of fractions.

Yet another aspect of glyph positioning is that of tracking. Glyph widths are expanded or contracted by applying a tracking value to a glyph. This value, called the track number, specifies whether intercharacter spacing is to be tightened or loosened. The actual positional shifts are the result of two-dimensional interpolation based on the track number, the text size in points, and the threshold values. This data is stored in a tracking table corresponding to that particular font. The threshold values are used to permit nonlinear tracking amounts. For example, one set of values can be used for text from 8 to 12 points, while other sets can be used for 12 to 15, 15 to 36, and over 36-point text.

Glyph positioning can also be used to optically align text edges. In some instances, glyphs seem to line up incorrectly at the margins. This optical effect is caused by two factors. First, glyph advance-widths contain an amount of extra white space to account for normal inter-glyph spacing. Since this space varies with the font size, it produces certain anomalies. FIG. 7 illustrates this alignment problem, wherein different sizes of the same font are flush left. The second problem is that, due to certain optical effects, curved lines do not appear to line up properly with straight lines. To compensate for this problem, curved letters are designed to extend slightly below the baseline, so that they appear to line up with straight letters.

This same effect happens on the extreme edges of lines. An example is illustrated in FIG. 8. The "O" is lined up with the "H's", in the sense that the leftmost black edge of the "H" is even with the leftmost black edge of the "O". However, the letters do not appear to be correctly aligned. In order to compensate for these effects, the present invention applies alignment information contained in the font. When determining the leading and trailing edges of a line of text, whether at tab stops or line starts, the present invention uses the optical leading and trailing edges. This is accomplished by reading a pair of offsets from the edges of the glyph, contained in the font tables.

One function of the present invention is that it makes a determination of whether a character is permitted to "hang" off one or both ends of a line. This function is applied to punctuation, such as quotation marks or periods. FIG. 9 illustrates a "hanging" left quotation mark and a period.

The currently preferred embodiment of the present invention contains an aspect wherein a layout can be centered within a particular width. Centering is performed as a continuous function, rather than being limited to a few special states (e.g., left, center, or right). This is accomplished through the use of a centering factor ranging from 0.0 (left) through 1.0 (right).

Furthermore, the present invention provides alignment to multiple baselines. The baseline of a character is a line that defines the position of the character with respect to other characters. A baseline is used as a reference from which character grow proportionally. In other words, the ascent portion of a character grows upwards from the baseline, while the descent portion of the character grows downwards. However, there can be dramatic differences in the general proportions of characters with reference to the baseline. FIG. 10 illustrates three scripts 1000–1002, wherein the baselines within each of the scripts match, but the relationship between the Roman 1000, Indic 1001, and Chinese 1002 scripts are incorrect. The baselines should be aligned on an inter-script basis. A correct inter-script baseline alignment is shown as scripts 1000–1005.

Another function provided by the present invention is that of justification. Justification is the process of typographically "stretching" or "shrinking" a line of text to fit within a given width. Portions of line gap is assigned to different classes of glyphs, at different priority levels. Unlike some prior art justification models based on a proportional assignment of extra whitespace in a fixed ratio of interword to intercharacter, the currently preferred embodiment permits assignment of whitespace at a given priority level to occur until either the gap is entirely filled or a maximum specified amount is reached. Consequently, intercharacter spacing need not occur as often in contrast to proportional models. If the gap can be satisfied by interword spacing, it will be so utilized, without the need for intercharacter spacing.

Each font supplies a set of default mappings from glyph index to priority class. Gap is generally filled in, starting at the highest priority class and working down to the lowest or until there is no gap left to fill. The priority assigned to glyphs can be overridden by an application at the run level.

There are two different actions that can occur with justification: adding whitespace because a line is too short, and removing whitespace because a line is too long. Different priorities and limits are employed, depending whether the line is required to grow or shrink. Furthermore, rather than always assuming a 50—50 split in distribution of the gap within a given glyph, separate specification values for the leading and trailing edges of a glyph are provided. Additionally, applications can override the justification that would normally occur by either overriding the behavior of a whole run of text and/or specifying different behavior for a specific glyph.

An unlimited gap can be assigned to a run. Once it is determined that a run has been assigned an unlimited run, all remaining gap is then assigned to that run, subject to the priority loop process described above. Hence, an application can do normal processing at one level and then have an unlimited run at the next lower level which uses the remaining gap.

The justification process is a continuous process. It is not limited to just "non" or "full". Rather, a continuous justification factor ranging from 0.0 to 1.0 is utilized, for example, to provide a filled ragged-right appearance to paragraphs. For instance, a justification factor of 0.8 specifies that 80% of the gap is filled on a line.

Figure 11:
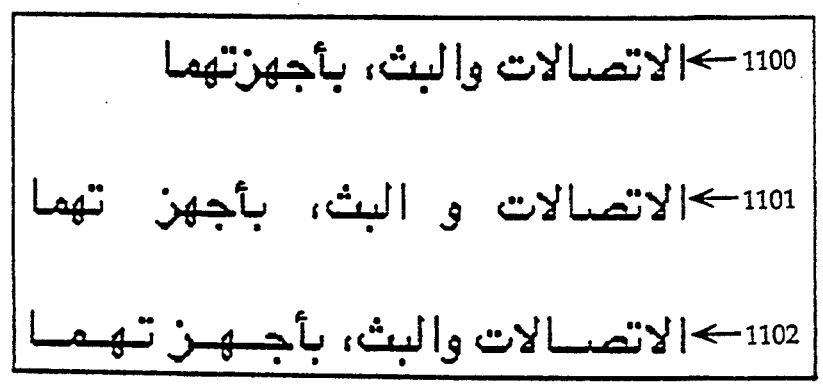
FIG. 11 illustrate three runs: the original text, justified without kashidas, and justified with kashidas.

In one form of justification used in Arabic, characters are extended by use of an extension bar, known as a kashida, rather than by the use of whitespace. FIG. 11 illustrate three runs, wherein run 1100 is the original text; run 1101 is justified without kashidas; and run 1102 is justified with kashidas. Kashidas are supported by the font tables. The font tables contain special extender bar glyphs.

The present invention also provides for attachments. Many languages use floating accent marks or vowel marks that "attach" themselves to other glyphs. Attachments are handled by implementing a ligature table which recognizes the attachments and outputs the appropriate glyph. For example, a ligature table could be set up to match the sequence of characters "A" followed by the "¨" attachment to yield in a "Ä" glyph.

Figure 12:
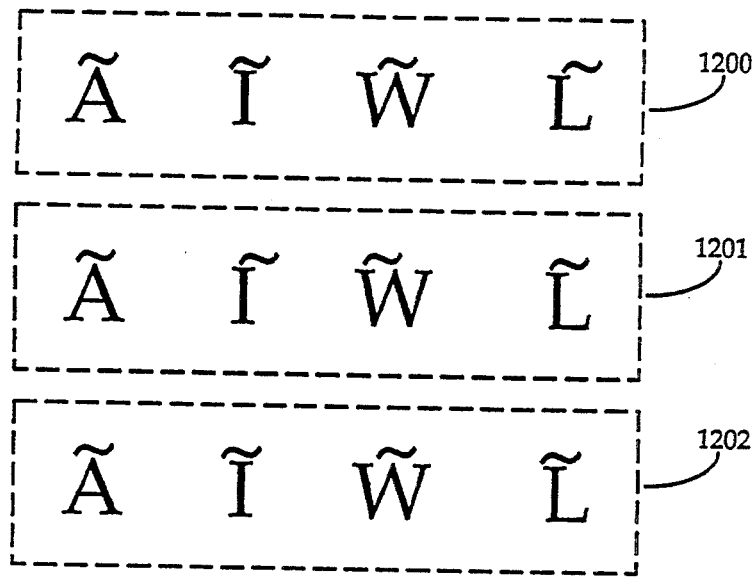
FIG. 12 illustrates three different cases of attaching a tilde mark.

An alternative embodiment for handling attachments is for attachment glyphs to be dynamically composited with some other glyph. The recipient glyph is called the baseform. The act of applying attachments is accomplished via anchorpoints, which are control points within the baseform's outline data for identifying attachment positions. An attachment table in the font is implemented to identify control points in various glyphs. These control points specify precise alignment of the glyphs. FIG. 12 illustrates three different cases 1200–1202 of attaching a tilde mark. In case 1200, the mark is centered over the center of the letter. Clearly, this approach suffers when applied to asymmetric letters, such as the letter "L". In case 1201, the mark is applied at some fixed displacement into the width of the glyph. Again, this approach is visually unappealing. The best results are those of case 1202, wherein each letter along with the mark have anchoring information specifying the correct placement of the marks, irrespective of the shape of the letter and mark.

Figure 13:
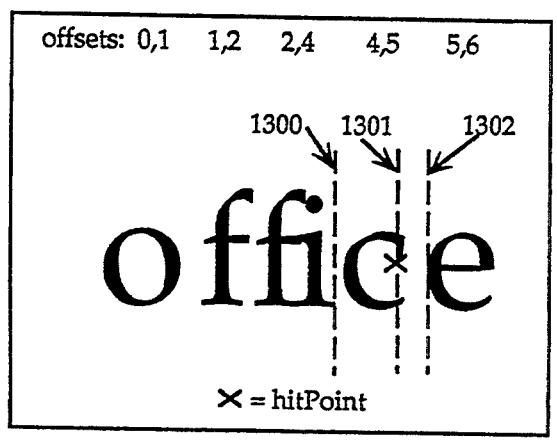
FIG. 13 illustrates hit-testing.

Once a layout has been created, it may be accessed by hit-testing. Hit-testing is the process of converting a location within a line into a character offset in the original string that corresponds to that location. Once a glyph corresponding to a hitpoint has been located, two distances representing the parts of the glyph on either side of the hitpoint is computed. Referring to FIG. 13, the first partial distance corresponds to the distance 1301–1300, and the last partial distance corresponds to 1302–1300. The terms "first" and "last" are relative to the layout origin, irrespective of character or run directionality.

The character offsets in the original string that correspond to the hit glyph that was found is classified as a hit side or a non-hit side offset. The hit side offset is the offset corresponding to the side closest to the hit (e.g., "5" in FIG. 13), and the non-hit side offset is the other offset of that glyph (e.g., "4" in FIG. 13). This process is sensitive to the 16-bit nature of the original character codes and ligatures.

The present invention utilizes contextual processing of glyphs on a line basis. A line is represented in the computer's memory in the form of a glyph array. A glyph array is an array of glyph records, which are stored in display order. Each glyph record contains various data concerning the glyph, including its glyph index. The glyph array is processed by a finite state machine. The finite state machine uses a class table and an array of states. A class table maps glyph indices into classes. An array of states define sets of rules for mapping a class into a new state and an action which modifies the glyph stream. The finite state machine maintains an index into the state array, known as the current state. The current state is initialized to a special value, called the initial state.

For each glyph in the glyph array, the finite state machine computes its class and maps this class and the current state into an action and a new state. It performs the action, sets the current state to the new state, and continues with the next glyph in the glyph array. When all glyphs in the glyph array have been processed, the finite state machine performs the action in the current state indicated by a special class, called end of text.

Figure 14:
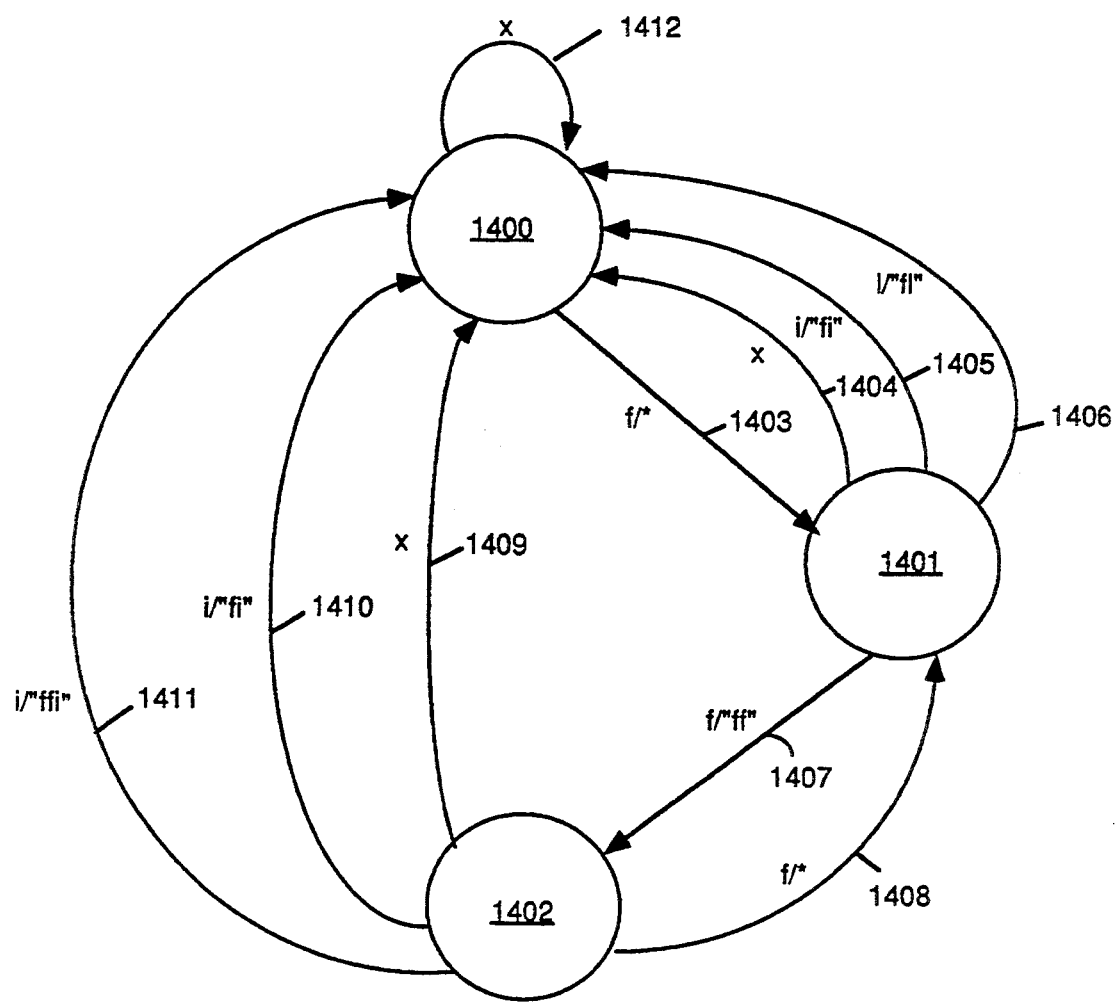
FIG. 14 illustrates a sample state diagram for generating an "f", "fi", "ff", and an "ffi" ligatures.

FIG. 14 illustrates an example of a finite state machine for generating the following ligatures: "fi", "fl", "ff", "ffi", and "ffl". The finite state machine starts at an initial state 1400. A first action 1403 of an "f" character being detected, causes the finite state machine to transition to state 1401. Any other character (represented by an "x"), other than an "f", results in the finite state machine staying in state 1400, as indicated by action 1412. From state 1401, if a second action results in the input of the character "i" 1405, this causes an "fi" ligature to be generated, and the finite state machine transitions back to state 1400. If the second action results in the input of the character "l" 1406 being generated, this causes an "fl" ligature to be generated, and the finite state machine transitions back to state 1400. If the second action is another "f" character 1407, the finite state machine transitions to state 1402. Otherwise, for any other second actions 1404, the finite state machine transitions back to state 1400. From state 1402, if a third action results in an "f" 1408, the finite state machine transitions to state 1401. If a third action results in an "i" character 1410, an "fi" ligature is generated, and the finite state machine transitions to state 1400. If a third action results in an "i" character 1411, an "ffi" ligature is generated, and the finite state machine transitions back to state 1400. Any other characters (represented by the "x") 1409, causes the finite state machine back to state 1400.

Line Layout Logic Flow

Figure 15:
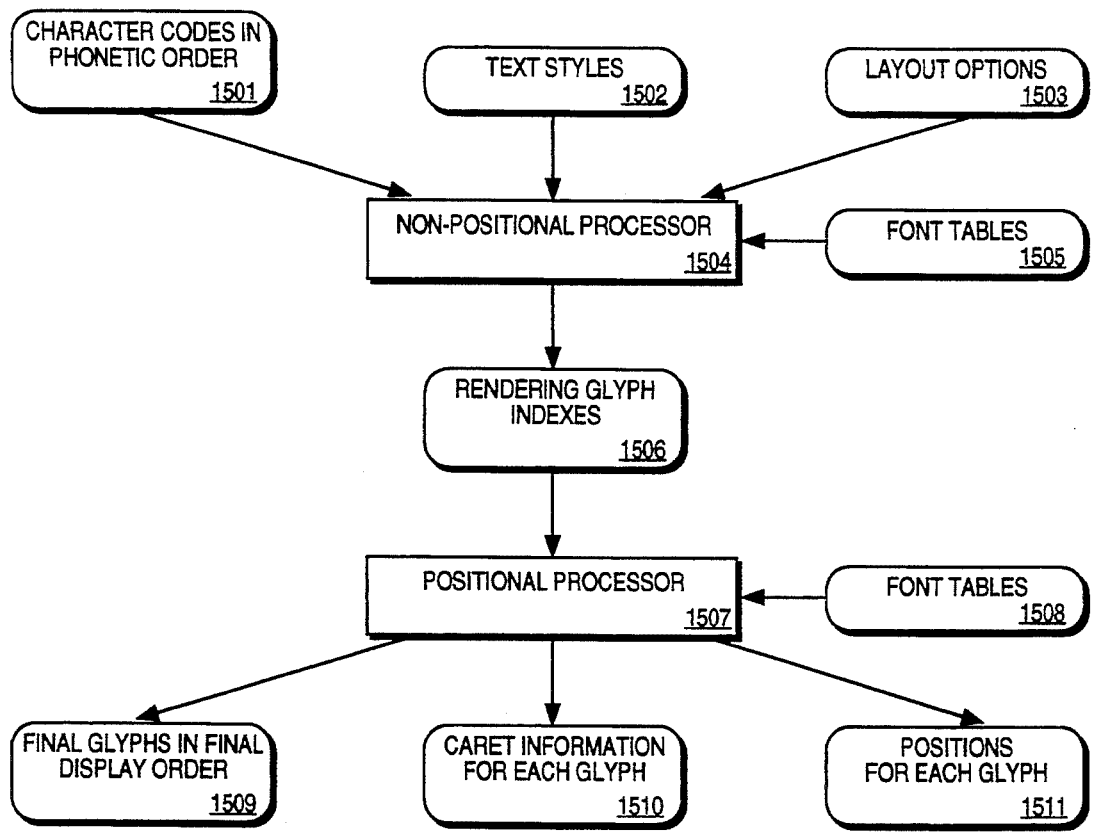
FIG. 15 is a block diagram illustrating the overall flow of the layout process.

This section describes the overall flow of logic comprising the line layout code in reference to FIGS. 15–21. Rounded rectangles in the figures signify pieces of data, while square-cornered rectangles signify processes. An arrow going into a square-cornered rectangle represents an input to that process. An arrow coming out of a rectangle represents an output from that process. FIG. 15 describes the overall flow of the layout process. Input 1501 comprises the text to be laid out. This text takes the form of character codes which are in phonetic order-that is, in the order that one would speak the letters one at a time. Input 1502 comprises a set of style information to be applied to the text 1501. The style information includes, but is not limited to, font, size of text, and per-run options that directly control the functioning of the various portions of the layout process. Input 1503 comprises options that apply to the entire line being laid out (as opposed to the styles 1502 which affect single runs). The options 1503 include specifications of the degree of justification and right/left alignment present in the line, which are specified as continuous values from zero to one. These inputs are fed into the NonPositional Processor 1504. The Non-Positional Processor 1504 uses the inputs 1501-1503, along with data 1505 read from tables in fonts, to create an array of rendering glyph indexes 1506. These indexes correspond to the correctly ordered visual appearance of the text. These indexes 1506 feed into the Positional Processor 1507, which uses them along with data 1508 read from other tables in fonts to determine several final outputs 1509-1511 from the overall layout process. These outputs include a final list of finally determined glyphs 1509 in correct display order; caret information 1510 that specifies the selectable edges of all the glyphs 1509; and final positions for each glyph 1511. Note that the caret information 1510 provides information, not only on simple glyph edges, but also for complex glyph edges such as occur in Arabic, Hebrew and Hindi word processing.

Figure 16:
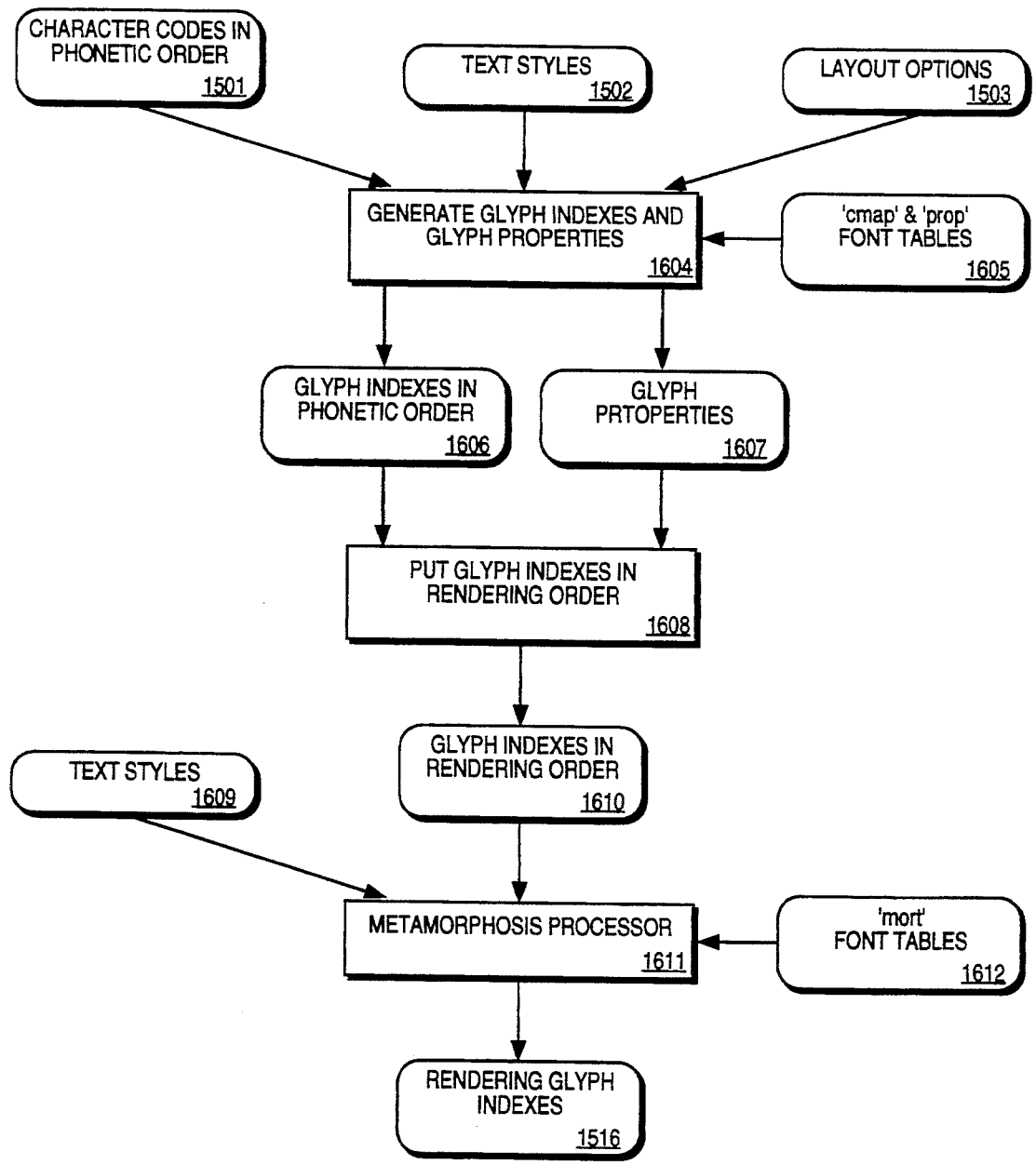
FIG. 16 is a block diagram illustrating the functionalities of the Non-Positional Processor.

FIG. 16 shows the functionality of the Non-Positional Processor in greater detail. The Non-Positional Processor converts the input character codes 1501 in phonetic order into rendering glyph indexes 1506 in rendering order. This is done in three main steps: character to glyph mapping, glyph reordering, and glyph metamorphosis.

Character to glyph mapping 1604 uses the 'cmap' tables 1605 in the fonts specified by the input text styles 1502 to convert the character codes 1501 into their corresponding glyph indexes 1606. These glyph indexes are used to retrieve glyph properties 1607 from the 'prop' tables 1605 in the fonts. Glyph properties contain information such as which glyph indexes correspond to glyphs which can hang into the margin (so-called "hanging punctuation"), which correspond to whitespace glyphs, and the rendering direction of the glyphs. The glyph reordering step 1608 uses the rendering direction properties of the glyphs 1607 to change the glyph indexes from phonetic order to rendering order 1610. The algorithm used is described in detail in appendix A of The Unicode Standard, Version 1.0, Volume 1, published by Addison Wesley, ISBN 0-201-56788-1.

Glyph metamorphosis is accomplished by the Metamorphosis Processor 1611. It changes the glyph indexes 1610 into rendering glyph indexes 1506 based on the 'mort' tables 1612 from the fonts and the text styles 1609 (a part of the overall text styles 1502).

Figure 17:
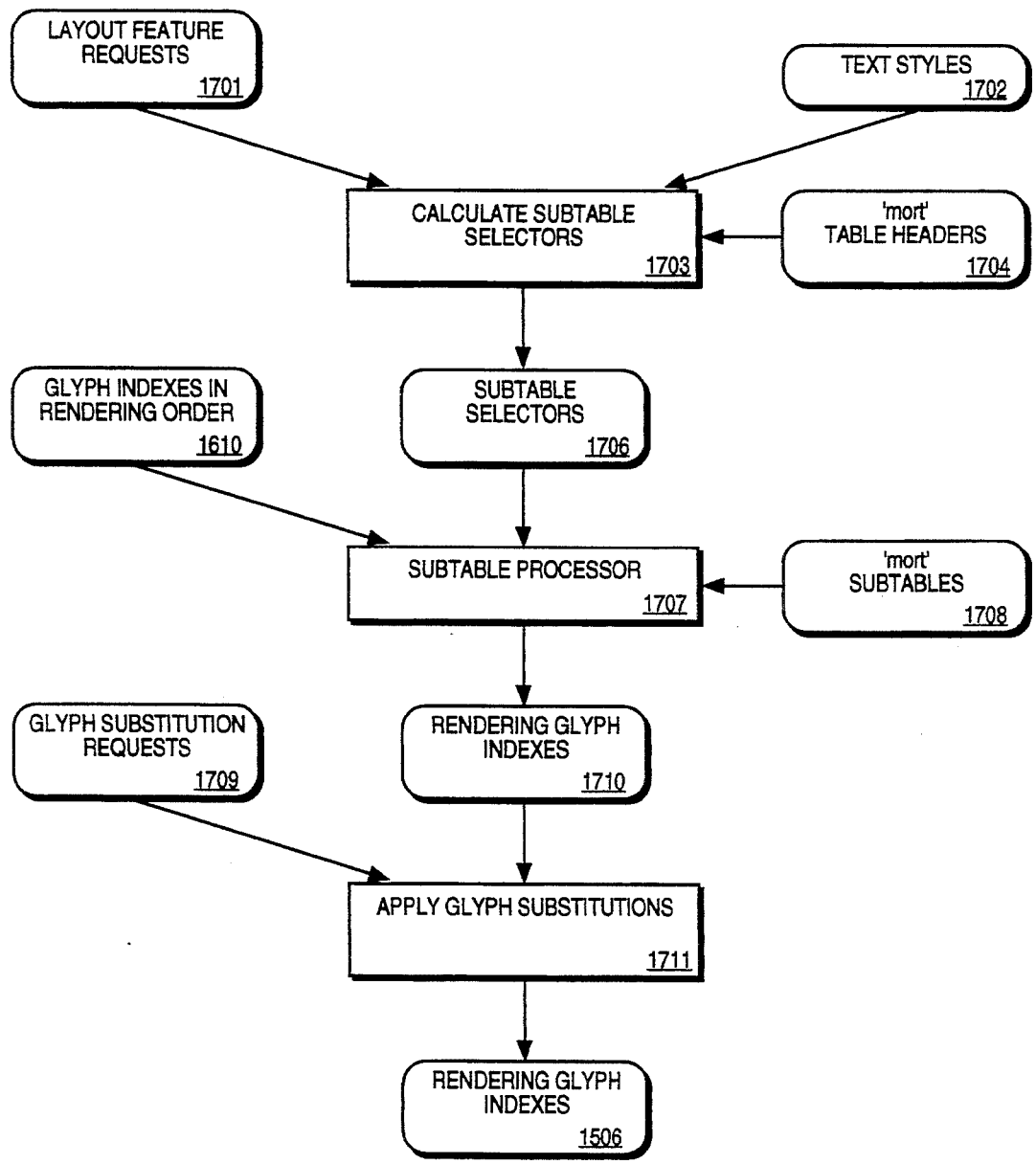
FIG. 17 is a block diagram illustrating the functionalities of the Metamorphosis Processor.

FIG. 17 illustrates the Metamorphosis Processor in greater detail. The Metamorphosis Processor changes glyph identity based on the 'mort' tables 1704 in the fonts specified by the text styles 1502. Basically, the 'mort' tables consist of headers followed by an ordered list of subtables. Each subtable specifies a particular kind of glyph identity change such as ligature formation, or swash substitution.

The Metamorphosis Processor consists of three main phases. In the first phase 1703, it uses the layout feature requests 1701, which are part of the text styles 1502, and information in the headers of the 'mort' tables 1704 to calculate a set of "subtable selectors" 1706.

In the second phase, the Subtable Processor 1707 changes glyph indexes 1610 as specified by the subtables selected by the subtable selectors 1706, resulting in the rendering glyph indexes 1710. The Subtable Processor is described in more detail in FIG. 18.

In the final phase 1711, glyph substitution requests 1709, which are also part of the text styles 1502, are used to make further changes to the glyph indexes 1710 resulting in the glyph indexes 1506.

Figure 18:
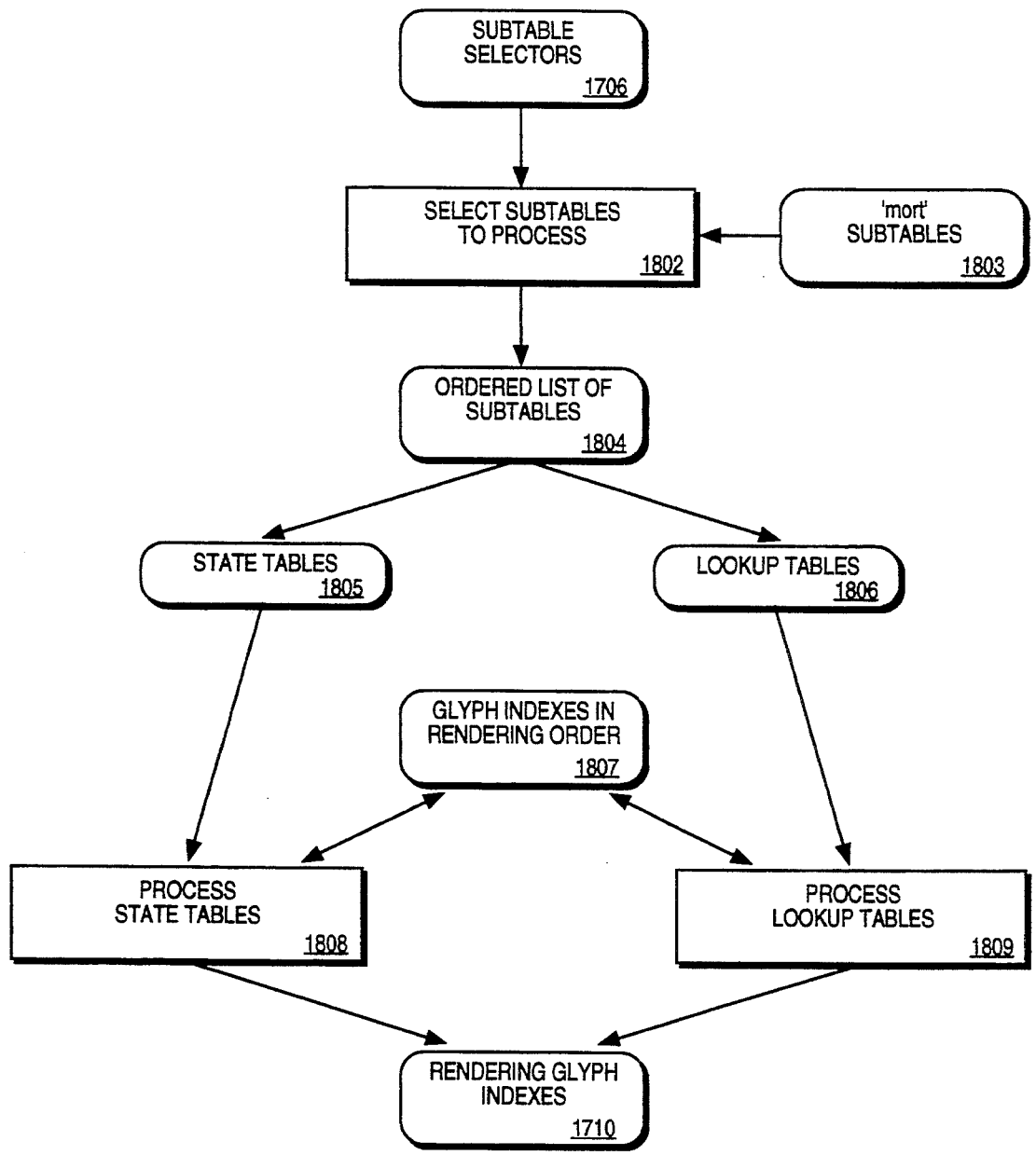
FIG. 18 is a block diagram illustrating the functionalities of the Subtable Processor.

FIG. 18 illustrates the Subtable Processor in greater detail. The process 1802 uses the subtable selectors 1706 to produce an ordered list of subtables 1804 from all the subtables contained in the 'mort' tables 1803. These subtables are used one at a time, in the order in which they are present in the 'mort' table, to change the glyph indexes. In other words, the glyph indexes which are the output of the first subtable are the input to the second subtable, and so on. Glyph indexes appear as 1807 in the diagram. Note that upon entry to the Subtable Processor, the glyph indexes in rendering order 1807 start off as exactly equal to the glyph indexes in rendering order 1610.

The subtables are of two basic types: state tables 1805 and lookup tables 1806. The state table processor 1808 processes the state tables 1805, thereby changing the glyph indexes 1807 according to the surrounding glyph indexes. There are three types of state tables: ligature substitution state tables, contextual glyph substitution state tables, and Indic rearrangement state tables. Ligature substitution state tables replace the glyph indexes of two or more glyphs by the glyph index of a ligature representing the combination of those glyphs. Contextual glyph substitution state tables change glyph indexes based on their context (e.g., whether they are at the beginning, middle, or end of a word). Indic rearrangement state tables produce small changes in the order of the glyph indexes which are required to render scripts based on the Devanagari alphabet.

The lookup table processor 1809 processes the lookup tables 1806, thereby changing glyph indexes 1807 without taking the surrounding context into account. Such changes are used for effects such as swash variations and small caps substitution.

Figure 19A:
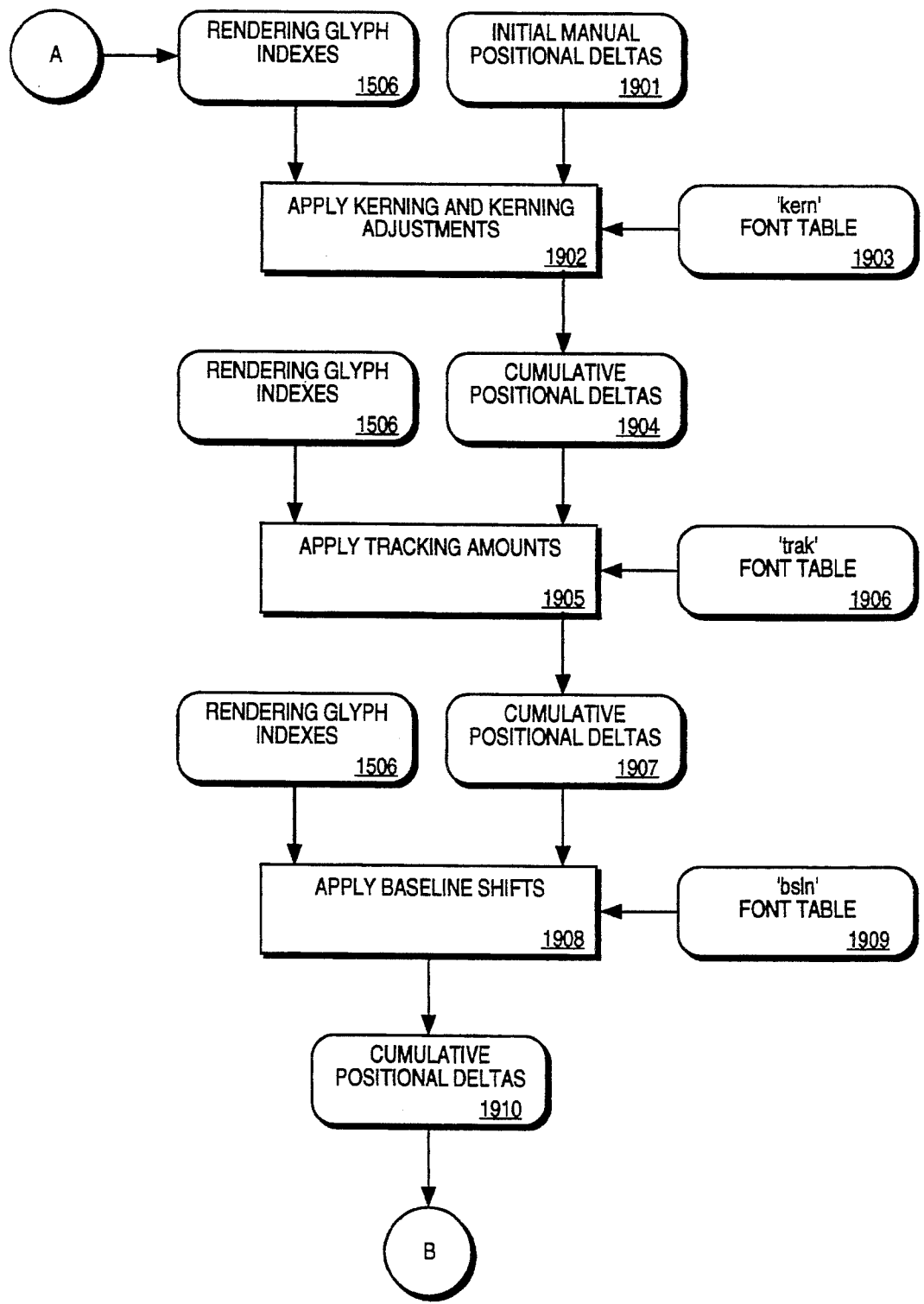
FIGS. 19a and b are block diagrams illustrating the functionalities of the Positional Processor.
Figure 19B:
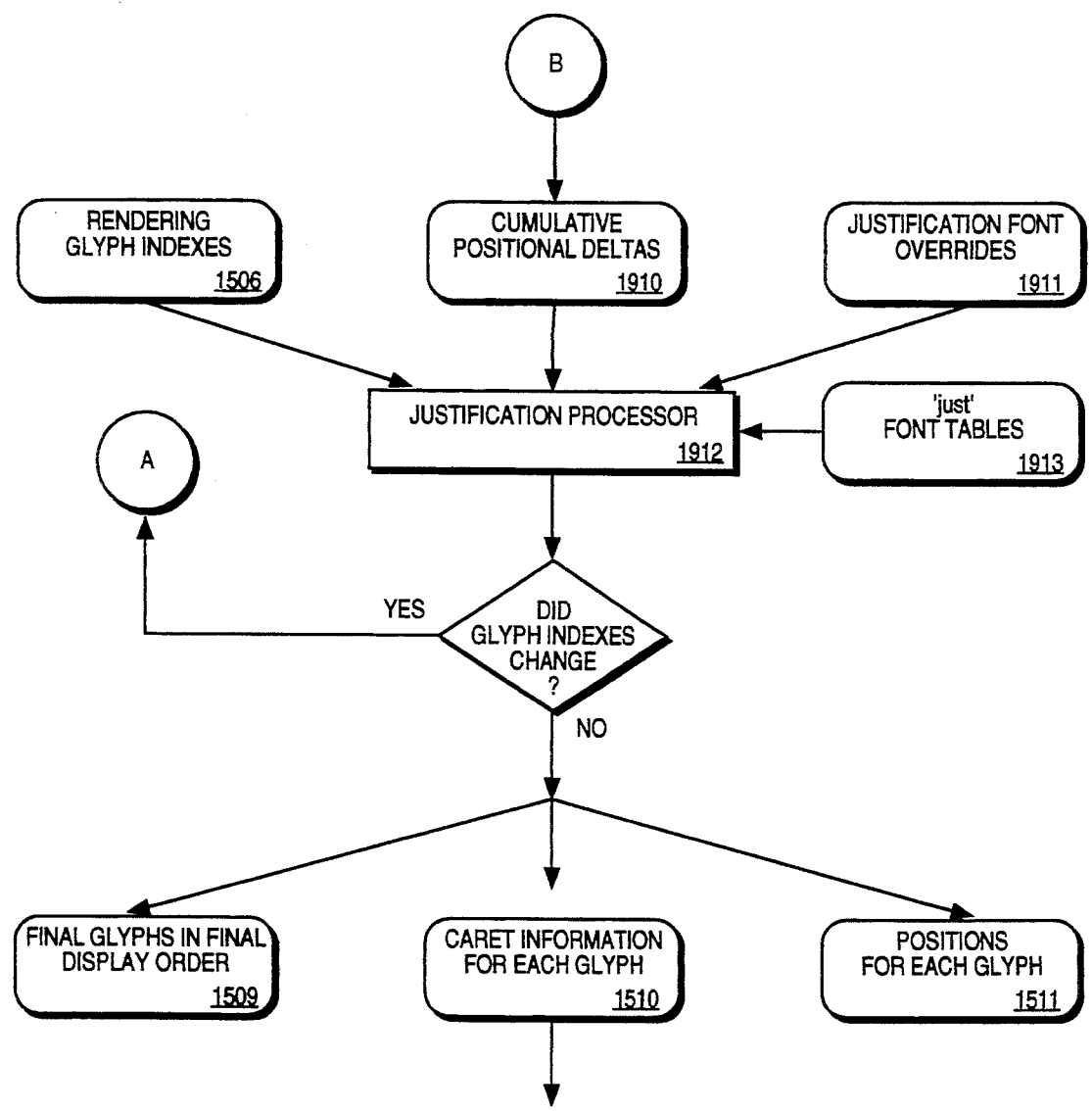

The final output of the Subtable Processor is the glyph indexes 1710, which are the result of processing the final subtable in the list 1804. FIG. 19 describes in more detail the Positional Processor. After the Non-Positional Processor has finished its work, the Positional Processor takes over. This Processor takes the set of glyph indexes 1506 that was generated by the Non-Positional Processor and determines where each of the glyphs should be placed. It does this by first creating an array of delta positions 1901 that are initialized to values corresponding to values in the text styles 1502. This set of initial deltas 1901 are then processed by a routine 1902 that uses kerning data located in font tables 1903. This process applies kerning independently in two dimensions: horizontal and vertical. The output from this process is a new set of delta positions 1904. Next, these deltas 1904 are processed by a routine 1905 that applies tracking. The routine 1905 takes the deltas 1904 and the glyph indexes 1506, as well as tracking data located in font tables 1906, and outputs modified cumulative deltas 1907.

These deltas 1907 are next processed by a routine 1908 that applies baseline shifts. The routine 1908 takes the deltas 1907 and the glyph indexes 1506, as well as baseline data located in font tables 1909, and produces as output modified cumulative deltas 1910. The deltas 1910 are then processed by a routine 1912 that justifies the text. Routine 1912 takes the deltas 1910, the glyph indexes 1506, and overrides 1911 (these are taken from the text styles 1502 information), as well as justification data located in font table 1913, and produces the final outputs of the layout process 1509, 1510 and 1511.

Figure 20:
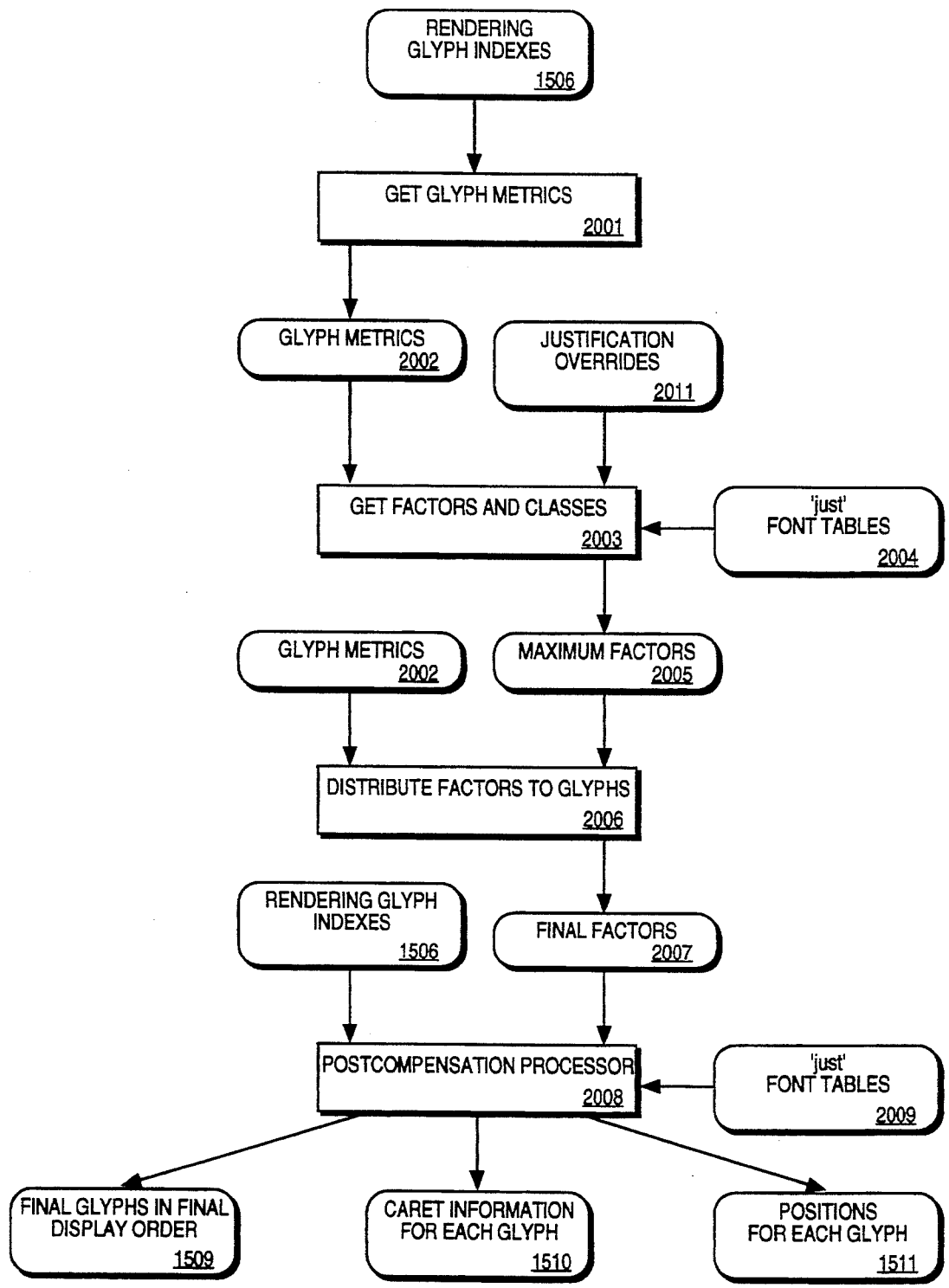
FIG. 20 is a block diagram illustrating the functionalities of the Justification Processor.

The details of the Justification Processor 1912 are illustrated in FIG. 20 (q.v.). Note that it is possible for the Justification Processor 1912 to modify the contents of the rendering glyph indexes set 1506. If this has happened, the Positional Processor starts over again at the kerning step 1902, using the modified rendering glyph indexes set 106.

FIG. 20 describes the Justification Processor. First, the rendering glyph indexes 1506 are measured to find their advance widths by process 2001. These metrics 2002 then become the inputs, along with overrides 2011 taken from text styles 1502 and data from the 'just' table in the font 2004, to a process 2003. Process 2003 determines the factors and classes for each glyph. The maximum justification factors 2005 that are created by process 2003, indicate the maximum amount of space permitted to be added on each side of each glyph in the line. The justification classes 2101 created by process 2003 are described in FIG. 21 (the Postcompensation Processor). Note that these maximum factors 2005, as well as the final factors 2007 that are derived from them, are separated into left (or top) and right (or bottom) cases and also into separate values for when the line needs to grow or shrink.

The next step in the Justification Processor is to take the maximum factors 2005 and the per-glyph metrics 2002 and perform the actual computations 2006 that determine how much space actually gets added to each side of every glyph in the line. These final factors 2007 are then passed, along with the rendering glyph indexes 1506 and data from the 'just' table in the font 2009, to the Postcompensation Processor 2008 (see FIG. 21 ). When process 2008 is completed, the final outputs (i.e., 1509, 1510 and 1511) of the entire layout process are assembled together.

Figure 21:
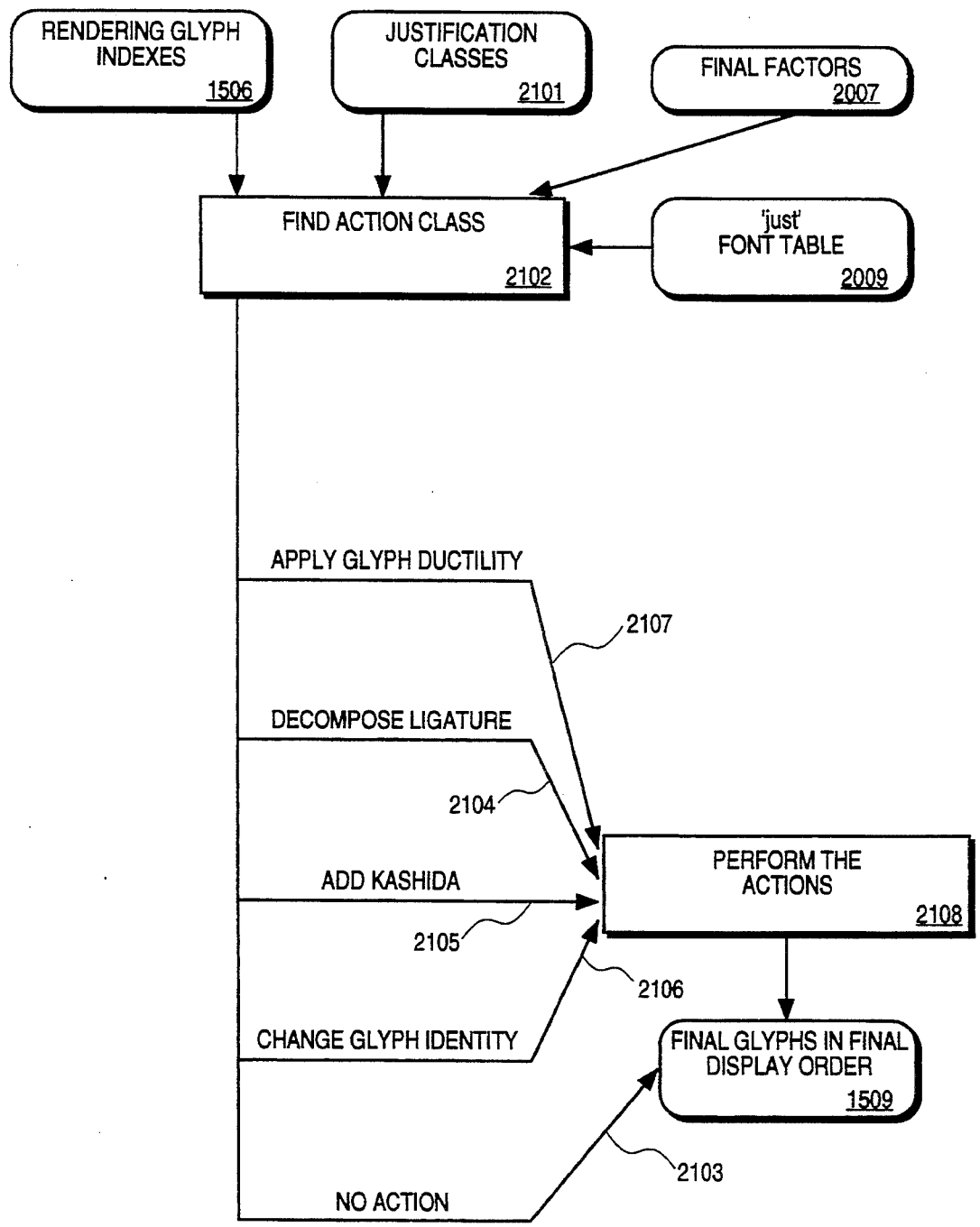
FIG. 21 is a block diagram illustrating the functionalities of the Postcompensation Processor.

FIG. 21 describes the Postcompensation Processor. The Postcompensation Processor makes small changes to the final, justified glyphs in order to further improve the appearance of the line of text being laid out. Each glyph is looked up in process 2102 to find its so-called action class. Inputs to process 2102 are the rendering glyph indexes 1506, the justification classes 2101 (created by process 2003), the final factors 2007, and the postcompensation data from the 'just' table in the font 2009. Once this action class is determined, a determination is made. If the action class indicates no action is to be taken 2103, nothing further is done to the glyph. If the action class indicates that ligature decomposition is to happen, then the set of rendering glyph indexes 1506 is changed to reflect this decomposition. If the action class indicates that a kashida (i.e., an extender bar) is to be added, then the bar is added. If the action class indicates that a glyph is to change identity, then the set of rendering glyph indexes 1506 is changed to reflect the new glyph index. If the action class indicates that a glyph is to deform in a ductile manner, then that is done. All these actions occur in the action loop, process 2108. Note that in cases 2104 and 2106, the decision box listed after process 1912 in FIG. 19 will take the "Yes" branch, forcing the Positional Processor to rework the line. In cases 2103, 2105 and 2107, the decision box will take the "No" branch, thereby arriving at the final set of glyphs in their final display order 1509.

Font Table Formats

The following description details the formats of the various tables that may be added to TrueType TM fonts in support of line layout functionality. Details concerning how the various layout features are driven by the font are set forth.

Binary searching

In order to make the layout process go as quickly as possible, many of the tables described below contain data that speed up the process of searching for the entry associated with a particular glyph index. This data is contained in a BinSrchHeader structure, which has the following form:

| Type | Name | Description |
| --- | --- | --- |
| uint16 | unitSize | Size of a lookup unit for this search. |
| uint16 | nUnits | Number of units of the preceding size to be searched. |
| uint16 | searchRange | The unitSize times the largest power of two that is less than or equal to nUnits. |
| uint16 | entrySelector | The log base 2 of the largest power of two less than or equal to nUnits. |
| uint16 | rangeShift | The unitSize times the difference of nUnits minus the largest power of two less than or equal to nUnits. |

In order to speed up the process of searching even more, a threshold value determines when the binary search should be abandoned and simple serial searching should take over. In order to make sure that this process works most efficiently, it is important to remember to include a special "end of search table" unit after all other units. The value associated with this unit should be 0×FFFF. The presence of this special value allows the search logic to be as fast as possible, at a fairly minimal cost in extra space in the font table.

Lookup tables

Lookup tables provide a way of taking a given glyph index and looking up some information. Some lookup tables involve groupings, allowing many different glyph indices to be treated the same (that is, to look up the same information for them). Others just do a simple array-type lookup given the glyph index. Lookup tables come in five different formats, each with a format number:

| Lookup Table Format | Description |
|---|---|
| 0 | Simple Array Format. The lookup data is just an array of 16-bit lookup values, indexed by glyph index. |
| 2 | Segment Single Format. A segment is defined as a contiguous range of glyph indices. In this format, each non-overlapping segment has a single lookup value which is applicable to all glyphs in the segment. (Segment mappings are described below) |
| 4 | Segment Array Format. A segment mapping is performed (as with the previous format), but instead of a single lookup result for all the glyphs in the segment, the lookup result is itself an array whose base is the starting glyph index of the segment. |
| 6 | Single Table Format. The lookup data is a sorted list of <glyph index, lookup result> pairs. |
| 8 | Trimmed Array Format. The lookup data is a simple trimmed array indexed by glyph index. (Trimmed arrays are described below) |

Given the above format values, the top-level description of a LookupTable is as follows:

| Type | Name | Description |
|---|---|---|
| uint16 | format | Format of this lookup table (one of the above values). |
| (variable) | fsHeader | Format-specific header (each of these is described below), followed by the actual lookup data. |

For a format 0 lookup table, the fsHeader is simply an array of 16-bit lookup values.

For a format 2 or 4 lookup table, the fsHeader is described as follows:

| Type | Name | Description |
|---|---|---|
| BinSrchHeader | binSrchHeader | The units for this binary search are LookupSegments, which will always have a minimum length of 6 (see below for their format). |
| LookupSegment | segments[] | The actual segments. These must be in sorted order, based on the first word in each one (that is, by the last glyph in each segment). |

A LookupSegment is defined as follows:

| Type | Name | Description |
|---|---|---|
| uint16 | lastGlyph | Last glyph index in this segment. |
| uint16 | firstGlyph | First glyph index in this segment. |
| uint16 | value[] | The lookup value. |

For a format 2 lookup table, the value is applied uniformly to all glyphs in the segment. For a format 4 lookup table, the value will be a single uint16, which is an offset from the start of the lookup table to an array of values; this array is indexed into by taking the given glyph index and subtracting the firstGlyph value (i.e. it is a trimmed array starting at firstGlyph).

For a format 6 lookup table, the fsHeader is described as follows:

| Type | Name | Description |
|---|---|---|
| BinSrchHeader | binSrchHeader | The units for this binary search are LookupSingles, which will always have a minimum length of 4 (see below for their format). |
| LookupSingle | entries[] | The actual entries, sorted by glyph index. |

A LookupSingle is defined as follows:

| Type | Name | Description |
|---|---|---|
| uint16 | glyph | The glyph index. |
| uint16 | value[] | The lookup value (of arbitrary size). |

For a format 8 lookup table, the fsHeader is defined as follows:

| Type | Name | Description |
|---|---|---|
| uint16 | firstGlyph | First glyph index included in the trimmed array. |
| uint16 | glyphCount | Total number of glyphs (will be last glyph minus firstGlyph plus one). |
| uint16 | valueArray[] | The lookup values (indexed by glyph index - firstGlyph). |

State Tables

A state table describes tables used by the finite state machine. It specifies the class mapping, the state array, and the set of actions. The finite state machine reads these tables and applies them to the glyph array. A state table starts with a state table header defined as follows:

| Type | Name | Description |
|---|---|---|
| uint16 | stateSize | Size of a state, in bytes (limited to 8 bits; the size is 16 bits for alignment purposes). |
| uint16 | classTable | Byte offset from beginning of the state table to the class table. |
| uint16 | stateArray | Byte offset from beginning of the state table to the state array. |
| uint16 | entryTable | Byte offset from beginning of the state table to the entry table. |

The class table maps a glyph index into a class. A class is a collection of glyphs which have some property in common. Examples of classes might be arithmetic digits, letters which form a ligature with a preceding "f", and characters which separate words.

The mapping is done using a trimmed array to map a range of glyph indices into eight bit class codes:

| Type | Name | Description |
| --- | --- | --- |
| uint16 | firstGlyph | Glyph index of the first glyph in the class table. |
| uint16 | nGlyphs | Number of glyphs in class table. |
| uint8 | classArray[] | The class codes (indexed by glyph index - firstGlyph). |

Class codes are in the range [0 ... stateSize −1]. Class code 0 is end of text, and should not appear in the class array. Class code 1 is out of bounds; all glyph indices which are less than firstGlyph, or greater than or equal to firstGlyph+nGlyphs will be assigned class code 1. Class code 1 may also appear in the class array. Class code 2 is deleted; sometimes contextual processing will remove a glyph from the glyph array by changing its glyph index to the deleted glyph index, 0×FFFF. This glyph code is automatically assigned class deleted, which should not appear in the class array. All other class codes can be assigned.

To limit the size of the class table, fonts should be designed so that glyphs which will be processed by a given state table have glyph indices which are in a small range.

A state is an array of eight bit entry indices:

| Type | Name | Description |
| --- | --- | --- |
| uint8 | entry[stateSize] | Index into entry table. (indexed by class code). |

The state array is just an array of states. The first entry in the state array is the initial state.

The values in the entry table have the following format:

| Type | Name | Description |
| --- | --- | --- |
| uint16 | newState | Byte offset from beginning of state table to the new state. |
| uint16 | flags | table-specific flags. |
| uint16 | glyphOffsets[] | Optional offsets to per-glyph tables. See below. |

The newState value is stored as a byte offset for quick access: the address of the entry table index is the sum of the state table address, the newState, and the class code. This means that the maximum number of states will depend on stateSize and the offset of the state array from the beginning of the state table.

The contents of the flag field is table specific. See the definitions of the 'mort', 'just' and 'kern' tables for details.

Some actions optionally compute a value by using a glyph index as an index into a per-glyph table. The tables only contain entries for those glyphs which will be used to index into the table. The offset is a signed word offset from the beginning of the state table to where the entry for glyph index 0 would be if it was in the table. This allows the address of a particular entry to be computed as:

(glyph index+offset)*2+state table address

Notice that this means that the offset can be either negative or positive, depending on the smallest glyph index in the table, and where the table starts relative to the beginning of the state table.

State table headers are imbedded in other tables. The class table, state array, and entry tables should follow the imbedding table's header, and can be in any order. The class and entry tables must be word aligned. Any per-glyph tables will follow these and must be word aligned.

The Baseline Table—tag 'bsln'

The baseline table contains information that identifies various baseline positions with respect to the font's fundamental (i.e. em-square) baseline, as well as which glyphs normally take these baselines. For example, a Roman font can contain information about where the drop caps baseline for its glyphs is located. The Baseline Table can also designate default baseline behavior for sets of glyphs.

The currently preferred embodiment of the present invention uses the information provided in this table in two ways. First, automatic baseline adjustment to a common line baseline is performed by looking up the baseline class for each glyph, and then adjusting that glyph's position (if needed) to the common baseline. Then client-supplied information is used to specify the position of each baseline in the overall line. For more information on how baselines are manipulated see the documentation on the Line Layout Manager. The following baseline values are defined (a total of 32 different values; this number is referred to in the following documentation as numberOfBaselineClasses):

| Baseline value | Description |
| --- | --- |
| 0 | Roman baseline. This defines the alignment used in most Roman-script languages, where most of the character is above the baseline, with portions possibly below it. The baseline appears near the bottom of the entire line. |
| 1 | Ideographic centered baseline. This defines the behavior used by Chinese, Japanese and Korean ideographic scripts, which center themselves halfway through the line height. |
| 2 | Ideographic low baseline. This also defines behavior used in Chinese, Japanese and Korean, like the previous value, but with the glyphs lowered slightly so that ideographs that appear adjacent to Roman characters appear to descend slightly below the Roman baseline. |
| 3 | Hanging baseline. This defines the alignment used in Devanagari and derived scripts, where most of the bulk of the glyphs are below the baseline, with some portions possibly above it, and where the baseline itself appears near the top of the line. This value is also used for drop capitals. |
| 4 | Math baseline. This defines the alignment used for setting mathematics, where operators like the minus sign need to be centered. It will usually be set at half the x-height in a font. |
| 5 through 15 | These are currently unassigned horizontal baselines. |
| 16 | Centered vertical baseline. This is for vertical text that is centered on the vertical baseline. |
| 17 | OffsetVerticalBaseline. This is for vertical text that is not centered on the vertical baseline. An example of this might be Mongolian. |
| 18 through 31 | These are currently unassigned vertical baselines. |

Baseline tables can have one of the following formats:

| Table Format | Description |
|---|---|
| 0 | Distance-based, no mapping. For this kind of table, shifts are specified in pure FUnit distance units. A single default baseline is designated for all glyphs in the font, so there is no mapping table associated with this format. |
| 1 | Distance-based, with mapping. This is the same as format 0 with the addition of a mapping table, which allows different glyphs in the font to have different designated "natural" baselines (glyphs not covered by the mapping table will get the default baseline mentioned above). |
| 2 | Control point-based, no mapping. For this kind of table, a particular glyph in the font is designated as having a set of control points that, after hinting, will be used to define the baseline positions. As with format 0, a single default baseline value is designated for all glyphs in the font, so there is no mapping table associated with this format. |
| 3 | Control point-based, with mapping. This is the same as format 2 with the addition of the mapping table; other comments are as for format 1. |

Associated with each of these formats is a structure that contains its formatspecific data. For a format 0 table, its format-specific part is called a Format0Part, and has the following format:

| Type | Name | Description |
|---|---|---|
| uint16 | deltas[] | These are the 32 deltas from the font's intrinsic (em-square) baseline to the 32 different baseline classes. See illustration below. |

For a format 1 table, the format-specific part is called a Format1Part, and has the following format:

| Type | Name | Description |
|---|---|---|
| uint16 | deltas[] | These are the 32 deltas from the font's intrinsic (em-square) baseline to the 32 different baseline classes. See illustration below. |
| LookupTable | mappingData | Lookup table (any format) mapping glyphs to their intrinsic baseline classes. Any glyphs not covered by the lookup table will be assigned a default baseline class. |

For a format 2 table, the format-specific part is called a Format2Part, and has the following format:

| Type | Name | Description |
|---|---|---|
| uint16 | stdGlyph | Glyph index of the glyph in this font to be used to set the baseline values. This glyph must contain a set of control points (whose numbers are contained in the following field) that will, possibly after hinting, be used to determine baseline distances. |
| uint16 | ctlPoints[] | Array of 32 control point numbers. These are associated with the stdGlyph. A value of 0xFFFF means there is no corresponding control point in the stdGlyph. |

For a format 3 table, the format-specific part is called a Format3Part, and has the following format:

| Type | Name | Description |
|---|---|---|
| uint16 | stdGlyph | Glyph index of the glyph in this font to be used to set the baseline values. This glyph must contain a |

| Type | Name | Description |
|---|---|---|
| | | set of control points (whose numbers are contained in the following field) that will, possibly after hinting, be used to determine baseline distances. |
| uint16 | ctlPoints[] | Array of 32 control point numbers. These are associated with the stdGlyph. A value of 0xFFFF means there is no corresponding control point in the stdGlyph. |
| LookupTable | mappingData | Lookup table (any format) mapping glyphs to their intrinsic baseline classes. Any glyphs not covered by the lookup table will be assigned a default baseline class. |

Given these format-specific parts, then, the top-level structure of the baseline table is as follows:

| Type | Name | Description |
|---|---|---|
| fixed | version | Version number of the baseline table (0x00010000 for the initial version). |
| uint16 | format | Format of the baseline table (as per above values) |
| uint16 | defaultBaseline | Default baseline value to be used for all glyphs (formats 0 and 2), or in the absence of mapping data for a particular glyph (formats 1 and 3). |
| (Variable) | parts | Format-specific data. This will be either a Format0Part, a Format1Part, a Format2Part or a Format3Part, as defined above. |

Shown below is an example to illustrate how this all works; for the purposes of this example, we'll consider the distance format. Consider the following outline 'D' in a Roman font:

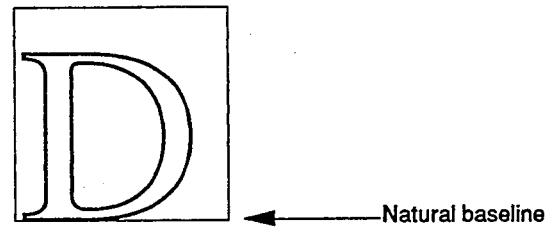
←———Natural baseline

We see here the 'D' sitting in the em-square, and the natural baseline here is at y=0 in font coordinates. By doing this, in the absence of layout, different sizes of this glyph will render with this line in common-that is, the pen will always rest on this line.

In the following diagram, the designation of two baselines: Roman and hanging are added. The Roman baseline in fact is the same as the font's natural baseline, so its delta would be zero. The hanging baseline is above the natural baseline by some distance; its delta would therefore be a positive number (on the order of 1500 FUnits, perhaps).

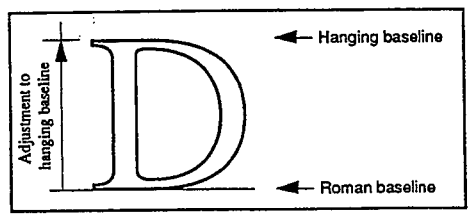

This delta information is used during line layout to first bring all the glyphs in the line to a common baseline, and then moving them to a final location, as shown in the following diagram:

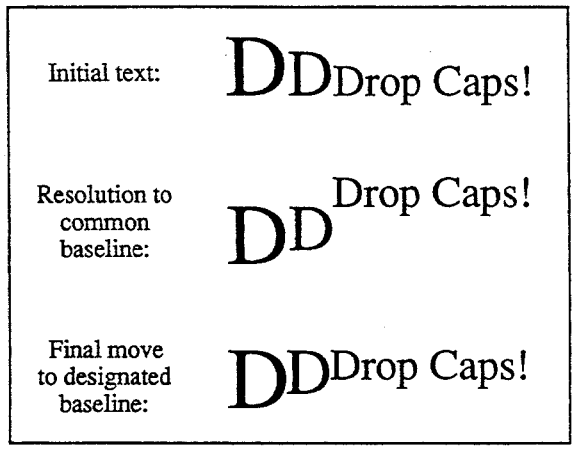

Example of a baseline table (non-control point) As an example, a baseline table for a font containing mixed kanji and Roman letters is created. The goal is to give all the Roman letters the Roman baseline value, and all the kanji the ideographic centered baseline value. For purposes of this illustration, assume that the Roman glyphs occupy glyph indices 2 through 270, and the kanji occupy glyph indices 271 through 8200.

Furthermore, assume the intrinsic baseline the kanji have is Roman-style (that is, the glyphs sit on the bottom of the em-square). Included is a shift amount of 855 FUnits to align the two. In addition, assume that the cap height for the Roman letters is 1520 (i.e., the hanging baseline distance). A sample table is given below:

| Offset/length | Value | Comment |
| --- | --- | --- |
| 0/4 | 0x00010000 | Version number (1.0 in fixed-point format). |
| 4/2 | 1 | Table format of 1 means this is a distance table with an associated lookup table. |
| 6/2 | 1 | The default baseline is the ideographic centered baseline. By specifying this value, we need only include non-kanji glyphs in the lookup table. |
| (The Format1Part starts here) | | |
| 8/2 | 0 | Delta from natural baseline to Roman baseline is zero. |
| 10/2 | 855 | Delta from natural baseline to ideographic centered baseline. |
| 12/2 | 0 | Don't bother with ideographic low baseline. |
| 14/2 | 1520 | Delta from natural baseline to hanging baseline. |
| 16/56 | 0 | Don't bother including the other baselines. |
| (Second part of Format1Part is the lookup table) | | |
| 72/2 | 2 | Lookup table format 2 (segment single table format). |
| (The next five fields are the BinSrchHeader) | | |
| 74/2 | 6 | Size of a LookupSegment (2 bytes for the starting glyph index, 2 bytes for the ending glyph index, and 2 bytes for the baseline value). |
| 76/2 | 1 | Number of entries in the table. |
| 78/2 | 6 | Search range. |
| 80/2 | 0 | Entry selector. |
| 82/2 | 0 | Range shift. |
| (The LookupSegment entries start here) | | |
| 84/2 | 270 | Ending glyph index for kanji. |
| 86/2 | 2 | Starting glyph index for kanji. |
| 88/2 | 0 | Baseline value for glyphs in this range (i.e. kanji). |
| 90/2 | 0xFFFF | Special value always needed at the end of segment lookup tables. |
| 92/2 | 0xFFFF | Starting glyph is same as the special value. |
| 94/2 | 0 | Doesn't matter what this value is. |

Example of a baseline table (control point)

This example uses the same basic setup as the previous one, with the addition of control point information for more accurate placement of baseline shifts. Glyph 22 is designated as the glyph containing the control point information. That glyph has control point #80 at the Roman baseline, control point #81 at the ideographic centered baseline, and control point #82 at the hanging baseline.

| Offset/length | Value | Comment |
| --- | --- | --- |
| 0/4 | 0x00010000 | Version number (1.0 in fixed-point format). |
| 4/2 | 3 | Table format of 3 means this is a distance table with an associated lookup table. |
| 6/2 | 1 | As in the previous example, we're designating the default baseline to be ideographic centered. |
| (The Format3Part starts here) | | |
| 8/2 | 22 | Glyph index of the glyph containing the control point info (we'll call this "the standard glyph" below). |
| 10/2 | 80 | Control point for Roman baseline in the standard glyph. |
| 12/2 | 81 | Control point for ideographic centered baseline in the standard glyph. |
| 14/2 | 0xFFFF | Special value meaning no control point for this baseline class. |
| 16/2 | 82 | Control point for hanging baseline in the standard glyph. |
| 18/56 | 0xFFFF | Special value meaning no control points for these baseline classes. |
| (Last section of Format3Part is the lookup table) | | |
| 74/2 | 2 | Lookup table format 2 (segment single table format). |
| (The next five fields are the BinSrchHeader) | | |
| 76/2 | 6 | Size of a LookupSegment (2 bytes for the starting glyph index, 2 bytes for the ending glyph index, and 2 bytes for the baseline value). |
| 78/2 | 1 | Number of entries in the table. |
| 80/2 | 6 | Search range. |
| 82/2 | 0 | Entry selector. |
| 84/2 | 0 | Range shift. |
| (The LookupSegment entries start here) | | |
| 86/2 | 270 | Ending glyph index for kanji. |
| 88/2 | 2 | Starting glyph index for kanji. |
| 90/2 | 0 | Baseline value for glyphs in this range (i.e. kanji). |

| Offset/length | Value | Comment |
| --- | --- | --- |
| 92/2 | 0xFFFF | Special value always needed at the end of segment lookup tables. |
| 94/2 | 0xFFFF | Starting glyph is same as the special value. |
| 96/2 | 0 | Doesn't matter what this value is. |

The Ligature Caret Table—tag 'lcar'

The Ligature Caret Table is used to identify natural division points inside ligatures. These division points are used to allow the illusion of full editing of text, even inside a ligature. Using this data, the currently preferred embodiment of the present invention permits the user to select only the 'i' portion of an 'fi' ligature, for example, even though the 'fi' itself is just a single glyph. A ligature caret table has one of the following formats:

| Table Format | Description |
| --- | --- |
| 0 | Linear. In this format the value(s) associated with a glyph are single FUnit values, representing positions along the baseline through which the subdivisions are made orthogonally to the baseline. |
| 1 | Control point. This format is similar to format 0, but instead of the splits being made at specified distances expressed in FUnits, they are made at the hinted location of a specified control point. Only one of the coordinates for this point will be used (the x-coordinate for horizontal metrics, or the y-coordinate for vertical metrics). |

The overall structure of the ligature caret table is as follows:

| Type | Name | Description |
| --- | --- | --- |
| fixed | version | Version number of the ligature caret table (0x00010000 for the initial version). |
| uint16 | format | Format of the ligature caret table (one of the above values). |
| (variable) | lookup data | Lookup table mapping glyphs to uint16 offsets from the start of the ligature caret table to the LigCaretClassEntry value for the specified glyph. |

The LigCaretClassEntry structure (whose offset is contained in the single lookup entry in the lookup table) has the following structure:

| Type | Name | Description |
| --- | --- | --- |
| uint16 | count | Number of int16s that follow. |
| int16 | partials[count] | Single values, representing either FUnit distances for format 0 tables, or control point numbers for format 1 tables. |

Example of a ligature caret table (non-control point)

Suppose that the ligature caret data for the 'fi' and 'fl' ligatures in a Roman font is to be included. First, let the glyph index for 'fi' be 192, and the FUnit distance into the 'fi' for the split be 556. Similarly, given that the glyph index for 'fl' is 193, its FUnit distance is 561. The table would look thusly:

| Offset/length | Value | Comment |
| --- | --- | --- |
| 0/4 | 0x00010000 | Version number (1.0 in fixed format). |
| 4/2 | 0 | Table format of 0 means this is a linear table. |
| (The lookup data starts here) | | |
| 6/2 | 6 | Lookup table format 6 (single table format). |
| 8/2 | 4 | Size of a LookupSingle (2 bytes for the glyph index, and 2 bytes for the offset from the start of this ligature caret table). |
| 10/2 | 2 | Number of entries in the table. |
| 12/2 | 8 | Search range (see section on lookup tables, above). |
| 14/2 | 1 | Entry selector (see section on lookup tables, above). |
| 16/2 | 0 | Range shift. |
| (The LookupSingle entries start here) | | |
| 18/2 | 192 | Glyphcode for 'fi'. |
| 20/2 | 30 | Offset to LigCaretClassEntry for 'fi'. |
| 22/2 | 193 | Glyphcode for 'fl'. |
| 24/2 | 34 | Offset to LigCaretClassEntry for 'fl'. |
| 26/2 | 0xFFFF | Special end value (see discussion in lookup table section) |
| 28/2 | 0 | Special end value |
| (The LigCaretClassEntries start here) | | |
| 30/2 | 1 | 'fi' only has 1 internal ligature caret place. |
| 32/2 | 556 | The FUnit offset. |
| 34/2 | 1 | 'fl' only has 1 internal ligature caret place. |
| 36/2 | 561 | The FUnit offset. |

The Optical Bounds Table—tag 'opbd'

The Optical Bounds table contains information identifying the optical edges of glyphs. This information is used to make the edges of lines of text line up in a more visually pleasing way (note that this information is never used within a line, but only at the edges of a line). For each glyph for which there is optical edge information, there are four numbers in this table, specifying deltas to the left, top, right and bottom optical edges. These deltas are the amounts by which the glyph should be moved in order to align its optical edge. The sign conventions are the same as the sign conventions for the font's coordinate system. For example, a left side delta of −50 FUnits associated with, say, an upper-case 'C' would mean that for those lines that start with that uppercase 'C', the glyph is to be shifted by 50 FUnits to the left.

One of the formats of this table permits the specification of optical edges via control points instead of FUnit values. In this case, the control point itself designates the position within the glyph that is to be aligned with the edge of the line of text.

Optical bounds tables may have one of these formats:

| Table Format | Description |
|---|---|
| 0 | Distance. In this format the values associated with a glyph are in FUnits. |
| 1 | Control point. In this format the locations of the glyph's optical edges are specified by control points. In this format, specify the special value −1 to indicate that no optical edge control point is specified for a given edge. |

The overall structure of the optical bounds table is as follows:

| Type | Name | Description |
|---|---|---|
| fixed | version | Version number of the optical bounds table (0x00010000 for the initial version). |
| uint16 | format | Format of the optical bounds table (one of the above values). |
| (variable) | lookup data | Lookup table mapping glyphs to uint16 offsets from the start of the Optical Bounds table to record containing the 4 int16 values (interpreted as distances or control points, depending on the table format). |

Example of an optical bounds table (distance format)

An example of a Roman font for which is provided optical edge data for rounded letters is described. Included are optical data for two glyphs, 'O' (glyph index 10 for this font) and 'A' (glyph index 43). Note that this same approach can be extended to a plurality of glyphs. Included is a top-side amount for the 'A', since its visual appeal for vertical text as well as horizontal is desired.

| Offset/length | Value | Comment |
|---|---|---|
| 0/4 | 0x00010000 | Version number (1.0 in fixed format). |
| 4/2 | 0 | Table format of 0 means this is a distance table. |
| (The lookup data starts here) | | |
| 6/2 | 6 | Lookup table format 6 (single table format). |
| 8/2 | 4 | Size of a LookupSingle (2 bytes for the glyph index, and 2 bytes for the offset). |
| 10/2 | 2 | Number of entries in the table. |
| 12/2 | 8 | Search range (see section on lookup tables, above). |
| 14/2 | 1 | Entry selector (see section on lookup tables, above). |
| 16/2 | 0 | Range shift. |
| (The LookupSingle entries start here) | | |
| 18/2 | 10 | Glyphcode for 'O'. |
| 20/2 | 30 | Offset to bounds for 'O'. |
| 22/2 | 43 | Glyphcode for 'A'. |
| 24/2 | 38 | Offset to bounds for 'A'. |
| 26/2 | 0xFFFF | Special format 6 lookup table end value |
| 28/2 | 0 | This is just an empty offset corresponding to the special table end value. |
| 30/2 | −50 | Left-side delta. |
| 32/2 | 0 | Top-side delta. |
| 34/2 | 55 | Right-side delta. |
| 36/2 | 0 | Bottom-side delta. |
| 38/2 | −10 | Left-side delta. |
| 40/2 | 15 | Top-side delta (remember positive is up in the font's coordinate system). |
| 42/2 | 0 | Right-side delta. |
| 44/2 | 0 | Bottom-side delta. |

Example of an optical bounds table (control point format) Assuming that the same two glyphs are to be included as in the previous example, this example specifies the optical positions via control points rather than via actual distances. Note the special value of "−1" which means that no optical information is included for the given side.

| Offset/length | Value | Comment |
|---|---|---|
| 0/4 | 0x00010000 | Version number (1.0 in fixed format). |
| 4/2 | 1 | Table format of 1 means this is a control point table. |
| (The lookup data starts here) | | |
| 6/2 | 6 | Lookup table format 6 (single table format). |
| 8/2 | 4 | Size of a LookupSingle (2 bytes for the glyph index, and 2 bytes for the 4 control point values). |
| 10/2 | 2 | Number of entries in the table. |
| 12/2 | 8 | Search range (see section on lookup tables, above). |
| 14/2 | 1 | Entry selector (see section on lookup tables, above). |
| 16/2 | 0 | Range shift. |
| (The LookupSingle entries start here) | | |
| 18/2 | 10 | Glyphcode for 'O'. |
| 20/2 | 30 | Offset to bounds for 'O'. |
| 22/2 | 43 | Glyphcode for 'A'. |
| 24/2 | 38 | Offset to bounds for 'A'. |
| 26/2 | 0xFFFF | Special format 6 lookup table end value |
| 28/2 | 0 | This is just an empty offset corresponding to the special table end value. |
| 30/2 | 36 | Control point controlling left-side optical edge. |
| 32/2 | −1 | No top-side optical effects for the 'O'. |
| 34/2 | 37 | Control point controlling right-side optical edge. |
| 36/2 | −1 | No bottom-side optical effects for the 'O'. |
| 38/2 | 32 | Control point controlling left-side optical edge. |
| 40/2 | 41 | Control point controlling top-side optical edge. |
| 42/2 | −1 | No right-side optical effects for the 'A'. |
| 44/2 | −1 | No bottom-side optical effects for the 'A'. |

The Glyph Properties Table—tag 'prop'

The Glyph Properties table contains different properties associated with each glyph in a font. An example of a property is "this glyph can hang off the left/top edge of a line." A single property value is a 16-bit quantity comprising different bits for different properties. These bits are defined as follows:

| Mask value | Interpretation |
|---|---|
| 0x8000 | The glyph is a floater (i.e. floating accent, vowel mark, etc.) |
| 0x4000 | The glyph can hang off the left edge of a horizontal line or the top edge of a vertical line. |
| 0x2000 | The glyph can hang off the right edge of a horizontal line or the bottom edge of a vertical line. |
| 0x1000 | If this bit is true, two things are true: this glyph is a bracketing glyph (e.g. parenthesis, bracket, brace, etc.); and the other glyph corresponding to this one is right-to-left. If this glyph is not a bracketing glyph, or if it is but the other glyph is left-to-right, this bit is false. See below for a further discussion of bracketing glyphs. |
| 0x0F00 | Offset to the corresponding bracketing glyph. Zero if this is not a bracketing glyph. See below for a further discussion of bracketing glyphs. |
| 0x00F0 | These must be zero in version 1 of this table. They are reserved for future properties. |
| 0x000F | These four bits contain the glyph's directionality class (see following table). For a discussion of what |

-continued

| Mask value | Interpretation |
|---|---|
| | these values mean, see the Unicode document. |

The directionality class of a glyph is one of the following eleven values (as defined in the Unicode document):

| Directionality Class | Description |
|---|---|
| (The first three values are the strong classes) | |
| 0 | Strong left-to-right. |
| 1 | Strong right-to-left. (non-Arabic) |
| 2 | Arabic letters (right-to-left) |
| (The next five values are the weak classes) | |
| 3 | European number. |
| 4 | European number separator. |
| 5 | European number terminator. |
| 6 | Arabic number. |
| 7 | Common number separator. |
| (The final four values are the neutral classes) | |
| 8 | Block separator. |
| 9 | Segment Separator. |
| 10 | Whitespace. |
| 11 | Other neutrals. |
| 12 through 15 | These values are not used. |

The format of a glyph properties table is as follows:

| Type | Name | Description |
|---|---|---|
| fixed | version | Version number of the baseline table (0x00010000 for the initial version). |
| uint16 | format | Format of the glyph properties table, set to 0 if no lookup data is present; set to 1 if lookup data is present. |
| uint16 | default properties | Default properties to be applied to a glyph if that glyph is not present in the lookup table. |
| (variable) | lookup data | Lookup table for non-defaulted glyph properties. |

Example of a glyph properties table

An example of a font containing both Hebrew and Roman characters is given below. Because many glyphs share similar properties, a format 2 (single segment) lookup table is implemented. Other useful choices here might be format 6 (if only a few glyphs differ from the default), or formats 0 or 8 (where the number of segments might otherwise be prohibitive).

| Offset/length | Value | Comment |
|---|---|---|
| 0/4 | 0x00010000 | Version number (1.0 in fixed-format). |
| 4/2 | 1 | Format 1: lookup data is present. |
| 6/2 | 0 | Default properties are left-to-right, cannot hang off either end of a line, and is not a floater. Note that by designating this as the default property, we need only provide data for those glyphs that differ from this default. |
| (The lookup table starts here) | | |
| 8/2 | 2 | Lookup table format 2 (segment single table format). |
| 10/2 | 6 | Size of a LookupSegment (2 bytes for the starting glyph index, 2 bytes for the ending glyph index, and 2 bytes for the properties value). |
| 12/2 | 2 | Number of entries in the table. |
| 14/2 | 12 | Search range (see section on lookup tables, above). |
| 16/2 | 1 | Entry selector (see section on lookup tables, above). |
| 18/2 | 0 | Range shift. |
| (The LookupSegment entries start here) | | |
| 84/2 | 2 | Ending glyph index for space. |
| 86/2 | 2 | Starting glyph index for space. |
| 88/2 | 10 | Properties for space (Whitespace). |
| 90/2 | 225 | Ending glyph index for Hebrew glyphs. |
| 92/2 | 150 | Starting glyph index for Hebrew glyphs. |
| 94/2 | 0x0001 | Properties for these glyphs (right-to-left). |

The Glyph Metamorphosis Table—tag 'mort' The glyph metamorphosis table specifies a set of text transformations, called text features. Examples of text features are ligature formation, number style, and ornateness. Although a standard set of text features have been defined, font designers are free to define their own.

The glyph metamorphosis table consists of a header followed by one or more metamorphosis chains. Each metamorphosis chain contains a specification of the text features it describes, and one or more metamorphosis subtables, specifying a set of atomic transformations which, when applied to the glyph array in the proper order, will result in the text features' text transformations.

Within a metamorphosis chain text features are specified by a TextFeature:

| Type | Name | Description |
|---|---|---|
| uint16 | featureType | The type of feature. |
| uint16 | featureSetting | The feature's setting. |

The feature type specifies the particular feature.

| Feature Type | Description |
|---|---|
| 0 | Ligature Formation. |
| 1 | Contextual Ornateness. |
| 2 | Case Substitution. |
| 3 | Vertical Substitution. |
| 4 | Indic-style rearrangement. |
| 5 | Number Style |
| 6 | Non-contextual Ornateness |
| 7 | Discritic Marks |
| 8 | Feature Set |
| 9 | Elevation (superiors and inferiors) |
| 10 | Fractions |

For each text feature, the feature setting specifies a particular variant of the feature. For example, a feature setting for the Ligature Formation feature might be "normal ligatures", and a setting for the Number Style feature might be "columnating numbers".

| Feature Setting | Description |
|---|---|
| 0 | Normal: form only those ligatures which are normally used. |
| 1 | Suppress: don't form any ligatures. |
| 2 | Mandatory: form only those ligatures which are required for correct rendering. |
| 3 | Optional: form all possible ligatures. |

The currently preferred defined settings for the Contextual Ornateness feature are:

| Feature Setting | Description |
|---|---|
| 0 | Normal: use normal ornate glyphs according to context |
| 1 | Suppress: don't use ornate glyphs. |
| 2 | Alternate 1: use ornate glyphs from alternate set 1 according to context |
| 3 | Alternate 2: use ornate glyphs from alternate set 2 according to context |
| 4 | Alternate 3: use ornate glyphs from alternate set 3 according to context |
| 5 | Alternate 4: use ornate glyphs from alternate set 4 according to context |

The currently defined settings for the Case Substitution feature are:

| Feature Setting | Description |
|---|---|
| 0 | None: do not perform case substitution. |
| 1 | Upper: substitute upper case letters for lower case letters. |
| 2 | Lower: substitute lower case letters for upper case letters. |
| 3 | Small Caps: substitute small caps for lower case letters. |

The currently defined settings for the Vertical Substitution feature are:

| Feature Setting | Description |
|---|---|
| 0 | Normal: substitute vertical variants in vertical text. |
| 1 | None: do not substitute vertical variants. |
| 2 | Always: always substitute vertical variants, even in horizontal text. |

The currently defined settings for the Indic-style rearrangement feature are:

| Feature Setting | Description |
|---|---|
| 0 | Normal: perform Indic-style rearrangement. |
| 1 | Suppress: don't perform Indic-style rearrangement. |

The currently defined settings for the Number Style feature are:

| Feature Setting | Description |
|---|---|
| 0 | Lining: use the "normal" lining style numbers. |
| 1 | Traditional: use the "traditional" style numbers |
| 2 | Columnation: use columnating numbers.. |

The currently defined settings for the Non-contextual Ornateness feature are:

| Feature Setting | Description |
|---|---|
| 0 | Plain: use plain glyphs. |
| 1 | Ornate 1: use glyphs from ornate set 1. |
| 2 | Ornate 2: use glyphs from ornate set 2. |
| 3 | Ornate 3: use glyphs from ornate set 3. |
| 4 | Ornate 4: use glyphs from ornate set 4. |
| 5 | Ornate 5: use glyphs from ornate set 5. |

The currently defined settings for the Diacritic Marks feature are:

| Feature Setting | Description |
|---|---|
| 0 | Show: show diacritic marks in their normal positions. |
| 1 | Hide: don't show diacritic marks at all. |
| 2 | Serialize: show diacritic marks as separate glyphs. |

The currently defined settings for the Feature Set feature are:

| Feature Setting | Description |
|---|---|
| 0 | Empty: a set of no features. |
| 1 | Plain: a set of features which produces "plain" text. |
| 2 | Fancy1: a set of features which produces "fancy" text. |
| 3 | Fancy2: a set of features which produces "fancy" text. |
| 4 | Fancy3: a set of features which produces "fancy" text. |

The currently defined settings for the Elevation feature are:

| Feature Setting | Description |
|---|---|
| 0 | Normal: no offset from baseline. |
| 1 | Superior: a glyph designed to be placed above the baseline. |
| 2 | Inferior: a glyph designed to be placed below the baseline. |

The currently defined settings for the Fraction feature are:

| Feature Setting | Description |
|---|---|
| 0 | Normal: form (existing) fraction ligatures normally. |
| 1 | Suppress: don't form ligatures normally. |
| 2 | Construct: synthesize fractions from superiors and inferiors. |

The glyph metamorphosis table header has the following format:

| Type | Name | Description |
|---|---|---|
| fixed | version | Version number of the glyph metamorphosis table (0x00010000 for the initial version). |
| uint32 | nChains | Number of metamorphosis chains which follow. |

Each metamorphosis chain starts on a longword boundary (i.e. a multiple of 4 bytes), and has a header specifying the chain's features and their relationship to the chain's subtables:

| Type | Name | Description |
|---|---|---|
| uint32 | defaultFlags | The default sub-feature flags for this chain (see below). |
| uint32 | chainLength | The length of the chain in bytes, including this header. |
| uint16 | nFeatureEntries | The number of entries in the chain's feature table (see below). |
| uint16 | nSubtables | The number of subtables in the chain. |

In general, the text transformation specified by a given combination of feature and setting will be composed of more than one atomic transformation. This relationship is described in the chain's feature table using a set of 32-bit value called sub-feature flags. The bits in the sub-feature flags each represent a particular subset of all the atomic transformations described by the chain's subtables. Although there are no restrictions on how these sub-feature flags are used, usually there will be a single bit for each combination of feature and setting. For example, 0×00000001 might mean "mandatory ligatures", 0×00000002 might mean "normal ligatures", and 0×00000004 might mean "optional ligatures".

The chain's header is followed by the feature table, which is an array of feature table entries:

| Type | Name | Description |
|---|---|---|
| TextFeature | feature | The feature type and setting. |
| uint32 | enableFlags | Flags for sub-features this feature and setting enables. |
| uint32 | disableFlags | Complement of flags for sub-features this feature and setting disables. |

The feature table is used to compute the sub-feature flags for a list of requested features and settings. The result is initialized to the chain's defaultFlags. Next, the entries in the feature table are gone through in order, and if the feature and setting is in the requested list, the result is ANDed with the entry's disableFlags and ORed with the entry's enableFlags. When this is finished, the result will contain the sub-feature flags corresponding to the list of requested features. Notice that if the list of requested features is empty, the result will be the chain's defaultFlags—i.e. the defaultFlags specify those subfeatures which are requested "by default". Notice also that the order of entries in the requested feature list is not important, and that the order of the entries in the feature table/s important; entries later in the feature table take precedence over entries earlier in the table. This is necessary because only the font designer knows the relationship between the features and the sub-features. Using the above sub-feature flag examples, the chain's defaultFlags might be 0×00000003 (for Normal Ligature Formation) and the feature table entries for the Ligature Formation feature might be:

| Feature | Setting | Enable Flags | DisableFlags |
|---|---|---|---|
| Ligature Formation | Mandatory | 0x00000001 (complement of 0x00000006) | 0xFFFFFFF9 |
| Ligature Formation | Normal | 0x00000003 (complement of 0x00000004) | 0XFFFFFFFB |
| Ligature Formation | Optional | 0x00000007 (complement of 0X00000000) | 0XFFFFFFFF |
| Ligature Formation | Suppress | 0X00000000 (complement of 0x00000007) | 0xFFFFFFF8 |

This feature table is set up so that the Optional setting will also enable the Normal and Mandatory sub-features, and the Normal setting will also enable the Mandatory sub-feature. The Suppress setting will disable the subfeatures for all other settings.

Each feature table ends with an entry for the Feature Set text feature with the Empty setting which turns o! all sub-feature flags for the chain:

| Feature | Setting | Enable Flags | DisableFlags |
|---|---|---|---|
| Feature Set | Empty | 0X00000000 (complement of 0XFFFFFFFF) | 0X00000000 |

It is convenient to keep those text features which share sub-features together in a single chain. Although there is no such restriction, a single metamorphosis chain is sufficient unless the font's text features cannot be specified with 32 sub-features.

Subtables have lengths that are multiples of 4 bytes. Padding should be added at the end of the subtable to ensure this.

The feature table is followed by the subtables, which describe the atomic transformations making up the chain's sub-features. Although each atomic transformation has its own format, the subtables begin with a common header:

| Type | Name | Description |
|---|---|---|
| uint16 | length | Length of subtable, including this header, in bytes. |
| uint16 | coverage | Coverage flags and atomic transformation type (see below). |
| uint32 | subFeatureFlags | Flags for sub-features this subtable describes. |

The subFeatureFlags field has a bit set for each sub-feature whose transformation requires the atomic transformation specified by the subtable. Subtables are traversed in order and are applied to the glyph array if the result of ANDing their subFeatureFlags with the requested sub-feature flags is non-zero.

For example, using the feature table above, there would be three subtables: one with subFeatureFlags set to 0×00000001 for the Mandatory ligatures, one with subFeatureFlags set to 0x00000002 for the Normal ligatures which aren't Mandatory, and one with subFeatureFlags set to 0×00000004 for Optional ligatures which aren't Mandatory or Normal. Thus, the Mandatory subtable will be applied if the Ligature Formation setting is Mandatory, Normal, or Optional; the Normal subtable will be applied if the Ligature Formation setting is Normal or Optional; and the Optional subtable will be applied if the Ligature Formation setting is Optional.

Thereby, the individual subtables simpler since each one deals with a particular subset of all the ligatures. On the other hand, a request for Optional ligatures means that three subtables will be applied. Given the following feature table:

| Feature | Setting | Enable Flags | DisableFlags |
|---|---|---|---|
| Ligature Formation | Mandatory | 0x00000001 (complement of 0x00000006) | 0xFFFFFFF9 |
| Ligature Formation | Normal | 0x00000002 (complement of 0x00000005) | 0XFFFFFFFA |
| Ligature Formation | Optional | 0x00000004 (complement of 0x00000003) | 0XFFFFFFFC |
| Ligature Formation | Suppress | 0X00000000 (complement of 0x00000007) | 0xFFFFFFF8 | any Ligature Formation request will result in a single sub-feature flag set for the requested setting with the highest precedence. Again, there would be three subtables: one with subFeature Flags set to 0×00000001 for the Mandatory ligatures, one with subFeatureFlags set to 0×00000002 for the Mandatory and Normal ligatures, and one with subFeatureFlags set to 0×00000004 for Mandatory, Normal, and Optional ligatures. The Normal and Optional subtables would be more complex (since the Normal table would duplicate the ligatures in the Mandatory subtable and the Optional table would duplicate the ligatures in the Optional subtable), but at most one subtable would be applied to the glyph array, which would take less time than applying three subtables.

This feature table could be used with the subtables from the first example by changing their subFeatureFlags to 0×00000007, 0×00000006, and 0×00000004 respectively.

The bits in the coverage field have the following interpretation:

| Mask value | Interpretation |
|---|---|
| 0x8000 | If set to 1, this subtable should only be applied to vertical text. If set to zero, this subtable should only be applied to horizontal text. |
| 0x4000 | If set to 1, this subtable should process the glyph array in descending order. If set to zero, this subtable should process the glyph array in ascending order. |
| 0x3FF8 | These bits are reserved and should be set to zero. |
| 0x0007 | These bits specify the subtable type. (see below). |

The subtable type specifies the type of atomic transformation the subtable describes. The defined values are:

| Subtable Type | Description |
|---|---|
| 0 | Indic rearrangement. |
| 1 | Contextual glyph substitution. |
| 2 | Ligature substitution. |
| 3 | (Not defined) |
| 4 | Non-contextual glyph substitution. |

The common subtable header is followed by a subheader the format of which depends on the subtable type.

The Indic rearrangement subtable is a state table:

| Type | Name | Description |
|---|---|---|
| StateHeader | stHeader | The Indic rearrangement state table header |

The actions in an Indic rearrangement subtable use no per-glyph tables. The table-specific flags have the following format:

| Mask value | Interpretation |
|---|---|
| 0x8000 | markFirst: if set, make the current glyph the first glyph to be rearranged. |
| 0x4000 | If set, don't advance to the next glyph before going to the new state. |
| 0x2000 | markLast: if set, make the current glyph the last glyph to be rearranged. |
| 0x1FF0 | These bits are reserved and should be set to zero. |
| 0x000F | Rearrangement verb (see below). |

An Indic rearrangement action specifies a rearrangement of the order of a contiguous range of glyphs in the glyph array. The markFirst and markLast flags are used to remember the position of this range in the glyph array, and the verb is used to specify the type of rearrangement. The first and last glyph values are set before the verb is applied. The table below shows the possible rearrangements, where A, B, C, and D represent individual glyphs and x represents an arbitrary sequence of glyphs:

| Verb | Results |
|---|---|
| 00 | no change |
| 01 | Ax => xA |
| 02 | xD => Dx |
| 03 | AxD => DxA |
| 04 | ABx => xAB |
| 05 | ABx => xBA |
| 06 | xCD => CDx |
| 07 | xCD => DCx |
| 08 | AxCD => CDxA |
| 09 | AxCD => DCxA |
| 10 | ABxD => DxAB |
| 11 | ABxD => DxBA |
| 12 | ABxCD => CDxAB |
| 13 | ABxCD => CDxBA |
| 14 | ABxCD => DCxAB |
| 15 | ABxCD => DCxBA |

The contextual glyph substitution subtable is also a state table:

| Type | Name | Description |
|---|---|---|
| StateHeader | stHeader | The contextual glyph substitution state table header |
| uint16 | substitutionTable | Byte offset from the beginning of the state table to the beginning of the substitution tables. (see below) |

The actions in a contextual glyph substitution subtable have table-specific flags and two offsets to per-glyph tables:

| Type | Name | Description |
|---|---|---|
| uint16 | newState | Byte offset from beginning of state table to the new state. |
| uint16 | flags | table-specific flags. |
| uint16 | markOffset | Offset from beginning of state table to substitution table for the marked glyph. |
| uint16 | currentOffset | Offset form beginning of state table to substitution table for the current glyph. |

The table-specific flag field has the following interpretation:

| Mask value | Interpretation |
|---|---|
| 0x8000 | setMark: if set, make the current glyph the "marked" glyph. |
| 0x4000 | If set, don't advance to the next glyph before going to the new state. |
| 0x3FFF | These bits are reserved and should be set to zero. |

A contextual glyph substitution specifies the substitution of other glyphs for both the glyph at the current position in the glyph array and an earlier glyph in the glyph array called the "marked" glyph. The substitution is done using per-glyph tables called substitution tables. If the setMark flag is set, the current glyph is made the marked glyph after the substitutions are made.

The ligature substitution subtable is also a state table:

| Type | Name | Description |
|---|---|---|
| StateHeader | stHeader | The ligature substitution state table header |
| uint16 | ligActionTable | Byte offset from the beginning of the state table to the ligature action tables. (see below) |

-continued

| Type | Name | Description |
|---|---|---|
| uint16 | ComponentTable | Byte offset from the beginning of the state table to the beginning of the component offset tables. (see below) |
| uint16 | ligatureTable | Byte offset from the beginning of the state table to the beginning of the ligature tables. (see below) |

The actions in a ligature substitution subtable have a table-specific flag field with the following interpretation:

| Mask value | Interpretation |
|---|---|
| 0x8000 | setComponent: if set, make the current glyph a component glyph. (see below) |
| 0x4000 | If set, don't advance to the next glyph before going to the new state. |
| 0x3FFF | Byte offset from beginning of state table to the ligature action list, which is a multiple of 4. |

The ligature substitution subtable specifies the substitution of a ligature glyph for a set of component glyphs. If the setComponent flag is set, the current glyph is remembered as a ligature component by pushing its location in the glyph array onto a stack. The stack is sixteen deep, which means that a ligature can be formed from up to sixteen components. If the offset is non-zero it points to a list of 32-bit ligature actions. The ligature action list must be long aligned, and has the following format:

| Mask value | Interpretation |
|---|---|
| 0x80000000 | last: if set, this is the last action in the list. |
| 0x40000000 | store: if set, substitute the ligature for the marked glyph. (see below) |
| 0x3FFFFFFF | Word offset from beginning of state table to component offset table. |

The ligature action list specifies how to use the component glyphs to construct a byte offset into a table of ligature glyph indices. The table is radix sorted by components—i.e. first by the first component, then by the second component, and so on. For example, the figure below shows a ligature table for a fictional set of ligatures composed of "a", "b", or "c" followed by "d", "e", or "f" followed by "g", "h", or "i".

The offset into the ligature table is computed as the sum of the offsets for each component. Each entry in the ligature action list contains the offset to a per-glyph table which gives the offset for the corresponding component. Given an offset to the first ligature in the table starting with a particular set of components, the component offset table for the next component would contain the relative offsets to the first ligature containing the particular component. Using the example ligature table, the offset for "a" would be 0, the offset for "b" would be 18, the offset for "c" would be 36, the offset for "d" would be 0, the offset for "e" would be 6, the offset for "f" would be 12 the offset for "g" would be 0, the offset for "h" would be 2, and the offset for "i" would be 4. Thus, the offset for "bfh" is 18+12+2=32, and the offset for "aei" is 0+6+4=10. This offset is still relative to the beginning of the ligature table. To produce an offset relative to the beginning of the state table, one of the component offset tables needs the offset of the ligature table added to its values.

As each entry in the action list is processed the corresponding component is popped from the stack. If the store flag in the entry is clear, the component glyph is replaced by the deleted glyph index; if the store or last flag is set, the accumulated offset is used to fetch glyph index for the ligature, which replaces the component glyph. Thus, an N component ligature is formed by replacing the component glyphs by the ligature glyph followed by N−1 deleted glyphs. When the entire ligature action list has been processed, the position in the glyph array of each ligature glyph is re-pushed onto the component stack so that the ligatures can be used as components in other ligatures.

Usually, a ligature action list will form only one ligature, so that the store flags will not be set for any entry. Multiple ligatures may be formed by setting the store flag on intermediate entries in the action list. The limit is that the component stack can only remember sixteen components.

Also note that for simple two-character ligatures it is simpler to use a contextual substitution subtable to substitute the ligature glyph for the first glyph, and the deleted glyph for the other glyph.

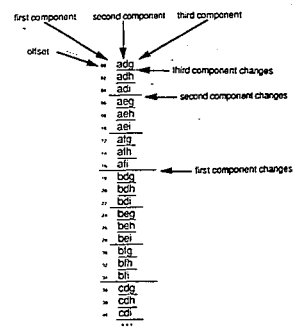

The non-contextual glyph substitution subtable is a lookup table which maps a single glyph index into another glyph index:

| Type | Name | Description |
|---|---|---|
| LookupTable | table | The non-contextual glyph substitution table. |

The Track Kerning Table—tag 'trak'

The Track Kerning table contains data that layout uses to perform adjustments to intercharacter spacing. This effect is similar to kerning, but in track kerning it is not the identities of the pair of characters that controls the amount, but rather the pointsize and a specified track number. For pointsizes and/or track numbers not directly included, layout will perform two-dimensional interpolation.

A Track Kerning table has the following format:

| Type | Name | Description |
|---|---|---|
| fixed | version | Version number of the baseline table (0x00010000 for the initial version). |
| uint16 | format | Format of the track kerning table (set to 0). |
| uint16 | horizOffset | Offset from start of track kerning table to TrackData for horizontal text (or 0 if none). |
| uint16 | vertOffset | Offset from start of track kerning table to TrackData for vertical text (or 0 if none). |
| uint16 | (pad word) | Always present (and set to 0). |
| TrackData | horizData | TrackData for horizontal text (if |

| Type | Name | Description |
|---|---|---|
| | | present). |
| TrackData | vertData | TrackData for vertical text (if present). |

The format of a TrackData table (which must be longword aligned) is as follows:

| Type | Name | Description |
|---|---|---|
| uint16 | nTracks | Number of separate tracks included in this table. |
| uint16 | nSizes | Number of point sizes included in this table. |
| uint32 | sizeTableOffset | Offset from start of the track kerning table to the start of the size subtable. |
| TrackTableEntry | | trackTable[ ] Array[nTracks] of TrackTableEntry records. |
| fixed | sizeTable[ ] | Array[nSizes] of size values. |

The format of a TrackTableEntry is as follows:

| Type | Name | Description |
|---|---|---|
| fixed | track | Track value for this record. |
| uint16 | nameID | ID in naming table for this track (this will be a string something like "loose", "very tight", etc.) |
| uint16 | offset | Offset from start of track kerning table to per-size tracking values for this track. |

The actual tracking values, in FUnits, are stored in the table at offset. The process works like this: first, the individual TrackTableEntries are searched to find the one corresponding to a given track value. If there is an exact match, fine; else, the two adjacent values are used for interpolation. Once these values are determined, the size table (at sizeTableOffset) is searched for the specified size. Again, if an exact match is not found, then interpolation is performed. For size, the index is computed; this index is used to access the appropriate element of the table of FUnits stored at offset.

Example of a track kerning table

Shown below is an example of a track kerning table that has two tracks (tight at −1 and loose at 1), with specific values for 12-point and 24-point text.

| Offset/length | Value | Comment |
|---|---|---|
| 0/4 | 0x00010000 | Version number (1.0 in fixed-point format). |
| 4/2 | 0 | Format 0 is the only one defined in this version. |
| 6/2 | 12 | Offset to TrackData for horizontal text. |
| 8/2 | 0 | Offset to TrackData for vertical text (0 = none). |
| 10/2 | 0 | Padding (to ensure the following TrackData table is longword aligned). |
| (The TrackData for horizontal text is next) | | |
| 12/2 | 2 | Number of tracks. |
| 14/2 | 2 | Number of sizes. |
| 16/4 | 36 | Offset to the size subtable. |
| (The 2 TrackTableEntry records follow) | | |
| 20/4 | 0xFFFF0000 | Fixed-point representation of −1 (first track). |
| 24/2 | 25 | ID in naming table for a string "tight". |
| 26/2 | 40 | Offset to two per-size tracking values for this track. |
| 28/4 | 0x00010000 | Fixed-point representation of +1 (second track). |
| 32/2 | 26 | ID in naming table for a string "loose". |
| 34/2 | 44 | Offset to two per-size tracking values for this track. |
| (The size subtable [i.e. the sizeTable array] is next) | | |
| 36/4 | 0x000C0000 | Fixed-point representation of 12 points. |
| 40/4 | 0x00180000 | Fixed-point representation of 24 points. |
| (Here start the per-size tracking values whose offset were included in the TrackTableEntry records) | | |
| 44/2 | −15 | FUnits of tight tracking at 12-point. |
| 46/2 | −7 | FUnits of tight tracking at 24-point. |
| 48/2 | 50 | FUnits of loose tracking at 12-point. |
| 50/2 | 20 | FUnits of loose tracking at 24-point. |

The Justification Table—tag 'just'

The Justification Table contains information that controls how line justification occurs. This table is complex, because there are many different options a font designer can choose to control justification, including the following:
   Specification of separate justification factors for the left-side and the rightside of any glyph;
   Specification of different sets of justification factors to be used in cases where the line needs to loosen as well as cases where the line needs to tighten;
   Specification of kashida glyphs, which are glyphs that are used to connect glyphs in connected scripts (such as Arabic or cursive Roman);
   Control over the order in which glyphs participate in the justification process;
   Selection of certain glyphs to be unlimited (that is, they will always soak up all remaining gap during justification);
   Contextual, state table-based designation of justification behaviors[1], so that the identical glyph might behave quite differently in different contexts; and
   Ability to undo ligatures back into their component parts if too much white space is being added during justification.

The information in this table is used by the Line Layout Manager to perform complex, multilingual line justification in as typographically correct a manner as possible.

Line justification using True Type ™ fonts

[1] The state tables controlling this process actually reside in the glyph metamorphosis table, for efficiency; see the description of that table for more information. Before describing the format of the tables in detail, the overall process of line justification is described to establish a context for the detailed description of the table. Consider a line to be a collection of glyphs, each of which has associated with it left and right factors, which are fractions of an em by which the glyph can grow or shrink on each side. For example, a value of 2.5 for the right-side grow factor means that 2.5 ems of whitespace at most may be added to the right side of the glyph. Some glyphs are also designated as unlimited, meaning they will soak up all available gap on a line.

Each glyph on the line has associated with it a justification class, identified contextually, that allows the set of factors used with that glyph to vary at different places on the line. Each glyph also has a justification priority, that identifies the stage at which the glyph starts to participate in justification.

The justification process proceeds as follows. First, consider the set of glyphs at the highest justification priority level on the line. Given a needed gap to be filled in order to justify a line of text, the glyphs' various point sizes are multiplied by their left and right factors to come up with a total extra distance that the set of glyphs could contribute (remembering to exclude the line ends). While cumulating this distance, note which glyphs (if any) have the unlimited attribute.

There will now be three cases to choose from. If this cumulated total extra distance exactly matches the gap to be filled, then add the extra to the set of glyphs and exit. If this cumulated extra distance is greater than the gap to be filled, then determine the ratio of needed gap divided by total extra gap, and apply this fraction (which will be less than one) to the max distance for each of the glyphs. If the cumulated extra distance is still not enough to fill the needed gap, further action depends on whether or not any unlimited glyphs were present in this priority set. If there were, then the new remaining gap is computed by subtracting the total extra distance from the needed gap, and then apportioning that remainder to the unlimited glyphs. If there were no unlimited glyphs, then this priority level is finished. The new needed gap (equal to the old one minus the distance we just apportioned) is computed. This same algorithm is implemented at the next lower priority level.

If after all priority levels have been processed there is still needed gap to be filled (which can happen if there are no unlimited glyphs anywhere on the line), then the highest priority level that actually appeared on the line is initialized to fill the remainder proportionally to those glyphs. The format of a justification table is as follows:

| Type | Name | Description |
|---|---|---|
| fixed | version | Version number of the justification table (0x00010000 for the initial version). |
| uint16 | format | Format of the justification table (set to 0). |
| uint16 | horizOffset | Byte offset from the start of the justification table to the JustificationHeader for horizontal text. |
| uint16 | vertOffset | Byte offset from the start of the justification table to the JustificationHeader for vertical text. |

The format of a JustificationHeader is as follows:

| Type | Name | Description |
|---|---|---|
| uint16 | justClassTableOffset | Offset to the justification class state table (see below). |
| uint16 | wdcTableOffset | Offset from start of justification table to start of the subtable containing the WidthDeltaClusters. |
| uint16 | pcTableOffset | Offset from start of justification table to start of postcompensation subtable (set to zero if none). |
| (variable) | lookupTable | Lookup table for justification factor glyph mapping. The lookup value is a 16-bit offset from the start of the widthDeltaClusters table to the specific WidthDeltaCluster for this segment. |
| (variable) | widthDeltaClusters | Actual WidthDeltaClusters (format described below). |
| (variable) | postcompTable | Actual postcompensation table (if present). |

The justification class state tables has the same format as the subtables contained in the 'mort' table (q.v.):

| Type | Name | Description |
|---|---|---|
| StateHeader | stHeader | The justification insertion state table header |

For this state table, the entry table entries comprise only the newState and the flags; there are no glyphOffsets. The interpretation of the flags for this state table is as follows:

| Mask value | Interpretation |
|---|---|
| 0x8000 | setMark: if set, make the current glyph the "marked glyph".(see below) |
| 0x4000 | If set, don't advance to the next glyph before going to the new state. |
| 0x3F80 | The justification class for the "marked glyph" if non-zero. |
| 0x007F | The justification class for the current glyph if non-zero. |

A justification class is a 7-bit value. As a line is being analyzed, each glyph is assigned a justification class given its identity and context. It is the combination of glyph index and justification class that is used to look up justification behaviors, rather than just the glyph index alone. In this way, subtle differences in the justification behavior of the same glyph can be provided for. In the descriptions below, this type is called JustClass.

If the justification class fields are non-zero, they are used to set the justification class of the corresponding glyph. If the setMark flag is set, the position of the current glyph in the glyph array is remembered, making it the marked glyph.

A WidthDeltaCluster is a collection of one or more WidthDeltaRecords associated with a particular glyph and one or more justification classes. It starts on a longword boundary, and has the following format:

| Type | Name | Description |
|---|---|---|
| uint32 | count | Number of records that follow. |
| uint32 | justClass | The justification class that is associated with the following WidthDeltaRecord (only 7 bits of this are used, with the rest used as padding to guarantee longword alignment of the following record). |
| WidthDeltaRecord | wdRecord | The actual WidthDeltaRecord. |

A WidthDeltaRecord contains information about the left and right (or top and bottom) justification factors and data about a class of glyphs. Its format is as follows:

| Type | Name | Description |
|---|---|---|
| fixed | beforeGrowLimit | Maximum number of ems by which the glyph is permitted to grow on the left or top side. |
| fixed | beforeShrinkLimit | Maximum number of ems by which the glyph is permitted to shrink on the left or top side. |
| fixed | afterGrowLimit | Maximum number of ems by which the glyph is permitted to grow on the right or bottom side. |
| fixed | afterShrinkLimit | Maximum number of ems by which the glyph is permitted to shrink on the right or bottom side. |
| uint16 | growFlags | Flags controlling the grow case (see descriptions of individual bits below). |
| uint16 | shrinkFlags | Flags controlling the shrink case (see descriptions of individual bits below). |

The growFlags and shrinkFlags bits are interpreted as follows:

| Mask value | Interpretation |
|---|---|
| 0x1000 | The glyph can take unlimited gap. This means that when it becomes this glyph's turn to participate in the justification process, it (and any other glyphs on the line having this bit set) will absorb all the remaining gap. |
| 0x000F | The justification priority of the glyph, as per the list below, is stored in these bits. |
| 0xEFF0 | These must be zero in version 1 of this table. They are reserved for future justification flags. |

The justification priority of a glyph is a number from zero to three that controls when that glyph enters into the justification process. The lower the value, the earlier a glyph begins to participate. Shown below are the default interpretations of these four values:

| Justification Priority | Meaning |
|---|---|
| 0 | Kashida priority. This is the highest priority during justification; any glyphs having this priority will be handled first. |
| 1 | White space priority. Any whitespace glyphs (as identified in the glyph properties table) will get this priority. These glyphs are processed after kashidas. |
| 2 | Intercharacter priority. This priority should be used for any remaining glyphs; glyphs of this priority are processed after whitespace glyphs during justification. |
| 3 | Null priority. This priority should be used for glyphs that only participate in justification after the above priorities. Since normally all glyphs will have one of the previous three values, you will not normally need this value. However, if there are glyphs that are not to participate in justification, and you don't just wish to set their factors to zero, you may instead assign those glyphs to the null priority. |

Example of a simple justification table

Shown below is an example of a Roman font containing the usual repertoire of glyphs. Justification factors for the space character, and a different set of factors for other characters are defined. This is not a cursive font, so there are no glyphs of kashida priority. Also, no glyphs get handled specially, so a justification class zero is used. For purposes of this example, glyph 2 is the space glyph, and glyphs 3 through 275 constitute the non-whitespace glyphs in the font.

| Offset/ length | Value | Comment |
|---|---|---|
| 0/4 | 0x00010000 | Version number is 1.0. |
| 4/2 | 0 | Zero is the current justification table format. |
| 6/2 | 10 | Offset to start of horizontal JustificationHeader subtable. |
| 8/2 | 0 | Offset to start of vertical JustificationHeader subtable (0=none). |
| (Horizontal JustificationHeader subtable starts here) | | |
| 10/2 | 0 | Offset to the justification class state table (0=none; this means that every glyph will get justClass zero). |
| 12/2 | 48 | Offset to start of width delta clusters. |
| 14/2 | 0 | Offset to start of postcompensation table (0=none). |
| (The lookup data starts here) | | |
| 16/2 | 2 | Lookup table format 2 (segment single table format). |
| 18/2 | 6 | Size of a LookupSingle (2 bytes for the starting glyph index, 2 bytes for the ending glyph index, and 2 bytes for the offset). |
| 20/2 | 2 | Number of entries in the table. |
| 22/2 | 12 | Search range (see section on lookup tables, above). |
| 24/2 | 1 | Entry selector (see section on lookup tables, above). |
| 26/2 | 0 | Range shift. |
| (The LookupSegment entries start here) | | |
| 28/2 | 2 | Ending glyph in this segment. |
| 30/2 | 2 | Starting glyph in this segment (whitespace). |
| 32/2 | 0 | Offset from start of WidthDeltaClusters table to this specific WidthDeltaCluster. |
| 34/2 | 275 | Ending glyph in this segment. |
| 36/2 | 3 | Starting glyph in this segment (non-whitespace). |
| 38/2 | 28 | Offset from start of WidthDeltaClusters table to this specific WidthDeltaCluster. |
| 40/2 | 0xFFFF | Ending glyph (special final segment). |
| 42/2 | 0xFFFF | Starting glyph (special final segment). |
| 44/2 | 0 | Offset from start of WidthDeltaClusters table to this specific WidthDeltaCluster. |
| 46/2 | 0 | Padding to guarantee that the WidthDeltaCluster table (which follows) starts on a longword boundary. |
| (The WidthDeltaClusters start here; the first one is for whitespace) | | |
| 48/4 | 1 | Count of number of <justification classes, WidthDeltaRecord> pairs that follow. |
| 52/4 | 0 | The justification class is zero. |
| 56/4 | 0x00008000 | Before grow limit. |
| 60/4 | 0xFFFFF500 | Before shrink limit. |
| 64/4 | 0x00008000 | After grow limit. |
| 68/4 | 0xFFFFF500 | After shrink limit. |
| 72/2 | 0x0001 | Grow flags (whitespace priority). |
| 74/2 | 0x0001 | Shrink flags (whitespace priority). |
| (The second WidthDeltaCluster starts here, for non-whitespace) | | |
| 76/4 | 1 | Count of number of <justification classes, WidthDeltaRecord> pairs that follow. |
| 80/4 | 0 | The justification class is zero. |
| 84/4 | 0x00002500 | Before grow limit. |
| 88/4 | 0xFFFFF500 | Before shrink limit. |
| 92/4 | 0x00002500 | After grow limit. |
| 96/4 | 0xFFFFF500 | After shrink limit. |
| 100/2 | 0x0002 | Grow flags (inter-character priority). |
| 102/2 | 0x0002 | Shrink flags (inter-character priority). |

The Postcompensation Sub table

The postcompensation subtable allows the font designer to specify special justification behaviors that occur in certain circumstances.

The format of the postcompensation table is as follows:

| Type | Name | Description |
|---|---|---|
| (variable) | pcLookupTable | Lookup table mapping glyph indices to 16-bit byte offsets from the start of the postcompensation subtable to the Postcompensation-Action record for this glyph. A value of zero means there is no action. |
| (variable) | pcActionRecords | Actions records whose offsets are contained in the previous lookup table. |

The PostcompensationAction records have the following format:

| Type | Name | Description |
|---|---|---|
| uint32 | actionCount | Number of ActionSub-records in the following array. |

| Type | Name | Description |
|---|---|---|
| ActionSubrecord | actSubrecord[] | ActionSubrecord data (array of actionCount of them). |

The ActionSubrecord record must be longword aligned and sorted by action class. It has the following format:

| Type | Name | Description |
|---|---|---|
| uint16 | actionClass | JustClass value associated with the following ActionSubrecord. |
| uint16 | actionType | Which kind of postcompensation action. |
| uint32 | actionLength | Length of this ActionSubrecord (must be a multiple of 4). |
| (variable) | actionData | Data specific to actionType. |
| (variable) | padding | If needed to guarantee actionLength is multiple of 4. |

An actionType of 0 is a decomposition action. This action allows ligatures to be decomposed back into their component pieces if the amount of extra intercharacter space being added by justification is too much or too little. The actionData portion of the ActionSubrecord has the following format for actionType=0:

| Type | Name | Description |
|---|---|---|
| fixed | lowerLimit | If the number of ems by which the glyph is being squeezed is less than (the absolute value) of this limit value, then do the decomposition. |
| fixed | upperLimit | If the number of ems by which the glyph is being grown exceeds this value, then do the decomposition. |
| uint16 | order | Order in which this ligature will be decomposed; useful, for example, in having infrequent ligatures decompose before more frequent ones. The ligatures on the line will be decomposed in increasing value of this order field. |
| uint16 | decomposedCount | Number of 16-bit glyph indices that follow; the ligature will be decomposed back into these glyphs. |
| uint16 | glyphs[] | Array of decomposed glyphs. |

An actionType of 1 is an unconditional add glyph action. This means that if any space is added at all, then the specified single glyph is added after this glyph and it is scaled linearly in the line direction in order to fill the gap. This is useful for simple horizontal kashida bars. The actionData portion of the ActionSubrecord has the following format for actionType=1:

| Type | Name | Description |
|---|---|---|
| uint16 | addGlyph | Glyph to be added if spacing is added. |

An actionType of 2 is a conditional add glyph action. It has two effects. First, similar to its unconditional counterpart, it adds a specified glyph after this glyph. However, rather than simply testing for any extra fractions of an em being added, it tests the growth against a particular factor. If the growth is less than this factor, then it acts exactly as the unconditional add glyph action. If, however, the growth is greater than or equal to this factor, then this glyph is replaced with an alternate form, and then the excess is recalculated on the basis of this new glyph. Next, the added glyph is stretched as before, by this new factor. This actionType is useful, for example, for Arabic final nun substitution (i.e. if the width is greater than a certain value, a differently-shaped glyph is substituted). The actionData portion of the ActionSubrecord has the following format for actionType=2:

| Type | Name | Description |
|---|---|---|
| fixed | substThreshhold | Number of ems at which this glyph will be replaced by the substGlyph value, and the growth factor recalculated. |
| uint16 | addGlyph | Glyph to be added as kashida. If this value is 0xFFFF, no extra glyph will be added. Note that if a glyph is added, justification will in general have to be redone. |
| uint16 | substGlyph | Glyph to be substituted for this glyph if the growth factor is at least substThreshhold. |

An actionType of 3 is a stretch glyph action. It does no insertion of extra glyphs. Rather, it applies a stretch factor to an existing glyph instead of adding whitespace to it. There is no actionData portion of the ActionSubrecord for actionType=3.

An actionType of 4 specifies ductile justification. This causes the actual shape of the glyph to change, via a font variations mechanism. The actionData portion of the ActionSubrecord has the following format for actionType=4:

| Type | Name | Description |
|---|---|---|
| ulong | variationAxis | The 4-byte tag identifying the ductile axis. This should be the hex value 0x64756374. |
| fixed | minimumLimit | The lowest value for the ductility axis that still yields acceptable appearance. Normally, this will be 1.0. |
| fixed | noStretchValue | This is the default value that corresponds to no change in appearance. Normally, this will also be 1.0. |
| fixed | maximumLimit | The highest value for the ductility axis that still yields acceptable appearance. |

Example of a justification table (with postcompensation and justification class state table)

Shown below is an Arabic font having kashida capabilities. The kashida glyph used is glyph number 226. The following glyph assignments are implemented: 2 is whitespace, 3–225 are regular glyphs, and 226 is the kashida. A state table that assigns justification class 1 to the first (i.e. visually leftmost) glyph in each word, and justification class 0 to all other glyphs is used.

First, the kashida-capable glyphs are contextually identified by the justification class table. Second, the actual em addition factors are specified as unlimited for these glyphs. Finally, given these unlimited em growth factors, the postcompensation table catches these glyphs and adds kashidas of the appropriate width.

| Offset/length | Value | Comment |
|---|---|---|
| 0/4 | 0x00010000 | Version number is 1.0. |
| 4/2 | 0 | Zero is the current justification table format. |
| 6/2 | 10 | Offset to start of horizontal JustificationHeader subtable. |
| 8/2 | 0 | Offset to start of vertical JustificationHeader subtable (0 = none). |

-continued

| Offset/length | Value | Comment |
|---|---|---|
| (Horizontal JustificationHeader subtable starts here) | | |
| 10/2 | 168 | Offset to the justification class state table. |
| 12/2 | 48 | Offset to start of width delta clusters. |
| 14/2 | 128 | Offset to start of postcompensation table. |
| (The lookup data starts here) | | |
| 16/2 | 2 | Lookup table format 2 (segment single table format). |
| 18/2 | 6 | Size of a LookupSingle (2 bytes for the starting glyph index, 2 bytes for the ending glyph index, and 2 bytes for the offset). |
| 20/2 | 4 | Number of entries in the table. |
| 22/2 | 24 | Search range (see section on lookup tables, above). |
| 24/2 | 2 | Entry selector (see section on lookup tables, above). |
| 26/2 | 0 | Range shift. |
| (The LookupSegment entries start here) | | |
| 28/2 | 2 | Ending glyph in this segment. |
| 30/2 | 2 | Starting glyph in this segment (whitespace). |
| 32/2 | 0 | Offset from start of WidthDeltaClusters table to this specific WidthDeltaCluster. |
| 34/2 | 226 | Ending glyph in this segment. |
| 36/2 | 3 | Starting glyph in this segment (non-whitespace). |
| 38/2 | 28 | Offset from start of WidthDeltaClusters table to this specific WidthDeltaCluster. |
| 40/2 | 0xFFFF | Ending glyph (special final segment). |
| 42/2 | 0XFFFF | Starting glyph (special final segment). |
| 44/2 | 0 | Offset from start of WidthDeltaClusters table to this specific WidthDeltaCluster. |
| 46/2 | 0 | Padding to guarantee that the WidthDeltaCluster table (which follows) starts on a longword boundary. |
| (The WidthDeltaClusters start here; the first one is for whitespace) | | |
| 48/4 | 1 | Count of number of <justification classes, WidthDeltaRecord> pairs that follow. |
| 52/4 | 0 | The justification class is zero. |
| 56/4 | 0x00008000 | Before grow limit. |
| 60/4 | 0xFFFFF500 | Before shrink limit. |
| 64/4 | 0x00000000 | After grow limit. |
| 68/4 | 0xFFFFF500 | After shrink limit. |
| 72/2 | 0x0001 | Grow flags (whitespace priority). |
| 74/2 | 0x0001 | Shrink flags (whitespace priority). |
| (The second WidthDeltaCluster starts here, for non-whitespace) | | |
| 76/4 | 2 | Count of number of <justification class, WidthDeltaRecord> pairs that follow. |
| 80/4 | 0 | Justification class is zero. |
| 84/4 | 0x00002500 | Before grow limit. |
| 88/4 | 0xFFFFF500 | Before shrink limit. |
| 92/4 | 0x00002500 | After grow limit. |
| 96/4 | 0xFFFFF500 | After shrink limit. |
| 100/2 | 0x0002 | Grow flags (inter-character priority). |
| 102/2 | 0x0002 | Shrink flags (inter-character priority). |
| 104/4 | 1 | JustClass value signifying a glyph identified as OK for having a kashida. |
| 108/4 | 0x00002500 | Before grow limit. |
| 112/4 | 0xFFFFF500 | Before shrink limit. |
| 116/4 | 0x00002500 | After grow limit. |
| 120/4 | 0xFFFFF500 | After shrink limit. |
| 124/2 | 0x1000 | Grow flags (kashida priority, unlimited growth potential-this is normal for kashida glyphs). |
| 126/2 | 0x0002 | Shrink flags (inter-character priority). |

-continued

| Offset/length | Value | Comment |
|---|---|---|
| (The postcompensation subtable starts here; note we're already at longword alignment, so no extra padding is needed) | | |
| 128/2 | 2 | Lookup table is format 2 (segment single format) |
| 130/2 | 6 | Size of a LookupSegment (2 bytes for the starting glyph index, 2 bytes for the ending glyph index, and 2 bytes for the offset to the PostcompensationAction record for this class). |
| 132/2 | 1 | Number of entries in the table. |
| 134/2 | 6 | Search range (see section on lookup tables, above). |
| 136/2 | 0 | Entry selector (see section on lookup tables, above). |
| 138/2 | 0 | Range shift. |
| (The single lookup segment is here) | | |
| 140/2 | 226 | Last glyph of whole font. |
| 142/2 | 2 | Start glyph of whole font. |
| 144/2 | 24 | Offset from start of postcomp subtable to this action record. |
| 146/2 | 0xFFFF | Ending glyph (special final segment). |
| 148/2 | 0xFFFF | Starting glyph (special final segment). |
| 150/2 | 0 | Offset from start of postcomp subtable to this action record. |
| (The PostcompensationAction records start here) | | |
| 152/4 | 1 | Number of ActionSubrecords that follow. |
| (ActionSubrecord follows) | | |
| 156/2 | 1 | JustClass value associated with the following ActionSubrecord. |
| 158/2 | 1 | The actionType is unconditional add glyph. |
| 160/4 | 12 | Length of this ActionSubrecord. |
| 164/2 | 226 | The glyph to be added (actionData) is the kashida glyph. |
| 166/2 | 0 | Padding to guarantee longword alignment. |
| (The justification class state table starts here) | | |
| 168/2 | 4 | The stateSize is 4. This reflects the three fixed classes (end of text, out of bounds and deleted glyph) and one that we're adding (letter). |
| 170/2 | 8 | Offset from the start of the state table to the class table. |
| 172/2 | 236 | Offset from the start of the state table to the state array. |
| 174/2 | 248 | Offset from the start of the state table to the entry table. |
| (The class table starts here) | | |
| 176/2 | 3 | First glyph we're mapping. |
| 178/2 | 223 | Count (takes us up through glyph 225). |
| 180/223 | 0x010101 ... | 223 bytes each containing the value 1. These are the justification classes for glyphs 3–225. |
| 403/1 | 0 | Padding to bring us back to word alignment. |
| (The state array starts here) | | |
| 404/4 | 0,0,0,1 | The initial state. This says that for classes end of text, out of bounds and deleted glyph, use entry table entry #0, and for class letter use entry table entry #1. |
| 408/4 | 0,0,0,1 | The non-letter state. This says the same as the previous state array entry. |
| 412/4 | 0,0,2,2 | The letter state. This says that for classes end of text and out of bounds use entry table entry #0, and for classes deleted glyph and letter use entry table entry #2. |
| (The entry table starts here) | | |
| 416/2 | 240 | Entry table entry #0 takes us to the non-letter state. |
| 418/2 | 0 | Entry table entry #0 doesn't affect the justification class. |
| 420/2 | 244 | Entry table entry #1 takes us to the letter state. |

-continued

| Offset/length | Value | Comment |
|---|---|---|
| 422/2 | 0x0001 | Entry table entry #1 sets the current glyph's justification class to one. |
| 424/2 | 244 | Entry table entry #2 takes us to the letter state. |
| 426/2 | 0 | Entry table entry #2 doesn't affect the justification class. |

The Kerning Table—tag 'kern' (extensions)

Kerning subtable format 1 contains a state table to allow contextual kerning of up to eight glyphs at once. The format specific header for a format 1 subtable looks like this:

| Type | Name | Description |
|---|---|---|
| StateHeader | stHeader | The contextual kerning state table header |
| uint16 | valueTable | Offset in bytes from the beginning of the subtable to the beginning of the kerning value table. (see below) |

The actions in a contextual kerning subtable contain a table-specific flag field which has the following interpretation:

| Mask value | Interpretation |
|---|---|
| 0x8000 | push: if set, push this glyph on the kerning stack |
| 0x4000 | If set, don't advance to the next glyph before going to the new state. |
| 0x3FFF | valueOffset: byte offset from the beginning of the subtable to the value table for the glyphs on the kerning stack. |

If the push flag is set, the position of the current glyph in the glyph array will be pushed onto a stack of up to eight glyphs, called the kerning stack. If the valueOffset is non-zero, it points to a value table. The value table is a list of FUnit kerning values. Each value pops one glyph from the kerning stack and applied the kerning value to it. The end of the list is marked by an odd value. The exact interpretation of the value is determined by the coverage field in the subtable header.

What is claimed is:

1. A computer system for rendering text, comprising:
an input device for inputting a character to said computer system:
a character code generator coupled to said input device for generating a character code corresponding to said character;
a memory for storing a font, the memory comprising a font table, said font table having a plurality of glyph indices, each glyph index of said plurality of glyph indices corresponding to a glyph of a plurality of glyphs;
a processor for mapping said character code to an initial glyph index of said plurality of glyph indices according to said font table, said initial glyph index corresponding to a first glyph of said plurality of glyphs, said first glyph having a first visual appearance;
said processor processing said initial glyph index to produce a revised glyph index, said revised glyph index corresponding to a second glyph, said second glyph having a second visual appearance different from said first visual appearance;
an output device for outputting said second glyph; and
a correlation mechanism for storing data which correlates said second glyph to said character code, once said second glyph has been output by said output device.

2. The computer system of claim 1, wherein at least one location for a caret within said second glyph is determined by information stored in said font table.

3. A computer system for rendering text, comprising;
an input device for inputting a character to said computer system;
a character code generator coupled to said input device for generating a character code corresponding to said character;
a memory for storing a font, the memory comprising a font table, said font table having a plurality of glyph indices, each glyph index of said plurality of glyph indices corresponding to a glyph of a plurality of glyphs;
a processor for mapping said character code to an initial glyph index of said plurality of glyph indices according to said font table, said initial glyph index corresponding to a first glyph of said plurality of glyphs, said first glyph having a first visual appearance;
said processor processing said initial glyph index to produce a revised glyph index, said revised glyph index corresponding to a second glyph, said second glyph having a second visual appearance different from said first visual appearance;
an output device for outputting said second glyph;
wherein said character is used in a sequence of characters; and
wherein said processor processes said initial glyph index depending on at least one other character in said sequence of characters.

4. The computer system of claim 3, wherein said processor processes said initial glyph index according to a finite state machine.

5. The computer system of claim 4, wherein said processor processes said initial glyph index such that said second glyph is said first glyph kerned in two axes.

6. The computer system of claim 4, wherein said processor processes said initial glyph index such that said second glyph is said first glyph kerned responsive to said at least one other character in said sequence of characters.

7. The computer system of claim 4, wherein said processor processed said initial glyph index such that said second glyph is said first glyph kerned according to said finite state machine.

8. The computer system of claim 4, wherein said processor processes said initial glyph index such that said second glyph is said first glyph justified according to information stored in said font table.

9. The computer system of claim 4, wherein said processor processes said initial glyph index such that said second glyph is said first glyph positioned according to a baseline specified by information stored in said font table.

10. The computer system of claim 4, wherein said processor provides continuous control over said sequence of characters, said continuous control including flushness, justification, kerning, and hanging punctuation.

11. The computer system of claim 4, wherein said processor processes said initial glyph index according to directional properties via a second finite state machine.

12. The computer system of claim 4 further comprising portions of said font table which are dynamically invoked by said processor.

13. The computer system of claim 3 wherein said at least one other character in said sequence of characters is a character immediately adjacent to said character, wherein said second glyph is a ligature formed by combining said character immediately adjacent to said character with said character.

14. The computer system of claim 3 wherein said initial glyph index is processed responsive to a relative position of said character in a word in said sequence of characters.

15. A computer system for rendering text, comprising:
- an input device for inputting a character to said computer system:
- a character code generator coupled to said input device for generating a character code corresponding to said character;
- a memory for storing a font, the memory comprising a font table, said font table having a plurality of glyph indices, each glyph index of said plurality of glyph indices corresponding to a glyph of a plurality of glyphs;
- a processor for mapping said character code to an initial glyph index of said plurality of glyph indices according to said font table, said initial glyph index corresponding to a first glyph of said plurality of glyphs, said first glyph having a first visual appearance;
- said processor processing said initial glyph index to produce a revised glyph index, said revised glyph index corresponding to a second glyph, said second glyph having a second visual appearance different from said first visual appearance;
- an output device for outputting said second glyph; and
- wherein said processor processes said initial glyph index such that said second visual appearance is said first visual appearance altered according to information in said font table, in order to compensate for space when said second glyph is justified.

16. The computer system of claim 15, wherein said processor processes said initial glyph index such that said space can be disproportionally added/subtracted on either side of said second glyph when said second glyph is justified.

17. In a computer system having an input device for inputting text, a processor, and an output device for outputting said text, a method of controlling appearances of said text, comprising the steps of:
- specifying a character to be input to said computer system by said input device; generating a character code corresponding to said character;
- mapping said character code to an initial glyph index according to a font table, said initial glyph index specifying a first glyph, the first glyph having a first visual appearance;
- processing said initial glyph index to generate a revised glyph index, said revised glyph index specifying a second glyph having a second visual appearance, said second visual appearance being different from the first visual appearance;
- outputting said second glyph corresponding to said revised glyph index; and
- storing data correlating said second glyph to said character code, once said second glyph has been outputted.

18. The method of claim 17, wherein a location within said second glyph is determined by information stored in said font table.

19. The method of claim 18, further including the step of specifying a sequence of characters into which said character will be input, wherein said processing depends on at least one other character in said sequence of characters.

20. The method of claim 19, wherein said processing is accomplished according to a finite state machine.

21. The method of claim 20, wherein said second glyph is said first glyph kerned in two axes.

22. The method of claim 20, wherein said second glyph is said first glyph kerned responsive to said at least one other character in said sequence of characters.

23. The method of claim 20, wherein said second glyph is said first glyph kerned according to said finite state machine.

24. The method of claim 20, wherein said second glyph is said first glyph justified according to information stored in said font table.

25. The method of claim 20, wherein said step of outputting includes outputting said second glyph according to a baseline specified by information stored in said font table.

26. The method of claim 25, wherein said processing provides continuous control over said sequence of characters, said continuous control including flushness, justification, kerning, and hanging punctuation.

27. The method of claim 20 further comprising the step of dynamically invoking portions of said font table.

28. In a computer system having an input device for inputting text, a processor, and an output device for outputting said text, a method of controlling appearances of said text, comprising the steps of:
- specifying a character to be input to said computer system by said input device;
- generating a character code corresponding to said character;
- mapping said character code to an initial glyph index according to a font table, said initial glyph index specifying a first glyph, the first glyph having a first visual appearance;
- processing said initial glyph index to generate a revised glyph index, said revised glyph index specifying a second glyph having a second visual appearance, said second visual appearance being different from the first visual appearance;
- outputting said second glyph corresponding to said revised glyph index; and
- wherein said second glyph is said first glyph compensated for space when said second glyph is justified,
- wherein said step of processing said initial glyph index is performed responsive to information in said font table.

29. The method of claim 28, wherein said second glyph is said first glyph with added/subtracted space on either side to justify said second glyph.

* * * * *